(12) United States Patent
Levy et al.

(10) Patent No.: US 7,596,552 B2
(45) Date of Patent: Sep. 29, 2009

(54) METHOD AND SYSTEM FOR EXTRACTING WEB DATA

(75) Inventors: Ori Levy, Ramat-HaSharon (IL); Jonathan Schler, Petach-Tikva (IL); David Tenne, RaAnana (IL); Akiva Navot, Petach-Tikva (IL)

(73) Assignee: BuzzMetrics Ltd., Herzlia Pituach (IL)

( * ) Notice: Subject to any disclaimer, the term of this patent is extended or adjusted under 35 U.S.C. 154(b) by 325 days.

(21) Appl. No.: 11/517,417

(22) Filed: Sep. 8, 2006

(65) Prior Publication Data

US 2007/0033188 A1 Feb. 8, 2007

Related U.S. Application Data

(62) Division of application No. 11/364,169, filed on Mar. 1, 2006, now abandoned.

(60) Provisional application No. 60/705,442, filed on Aug. 5, 2005.

(51) Int. Cl.
*G06F 17/30* (2006.01)
(52) U.S. Cl. .......................................................... 707/3
(58) Field of Classification Search ...................... 707/2, 707/3, 7
See application file for complete search history.

(56) References Cited

U.S. PATENT DOCUMENTS

| | | |
|---|---|---|
| 3,950,618 A | 4/1976 | Bloisi |
| 5,041,972 A | 8/1991 | Frost |
| 5,077,785 A | 12/1991 | Monson |
| 5,124,911 A | 6/1992 | Sack |
| 5,301,109 A | 4/1994 | Landauer et al. |
| 5,317,507 A | 5/1994 | Gallant |
| 5,321,833 A | 6/1994 | Chang et al. |
| 5,371,673 A | 12/1994 | Fan |
| 5,495,412 A | 2/1996 | Thiessen |
| 5,519,608 A | 5/1996 | Kupiec |
| 5,537,618 A | 7/1996 | Boulton et al. |
| 5,659,732 A | 8/1997 | Kirsch |

(Continued)

FOREIGN PATENT DOCUMENTS

| | | |
|---|---|---|
| EP | 1052582 | 11/2000 |
| WO | 0017824 | 3/2000 |

OTHER PUBLICATIONS

Bournellis, Cynthia, "Tracking the hits on Web Sites", Communications International: London: Sep. 1995. vol. 22, Issue 9, 3 pages.
Word of Mouth Research Case Study, "The Trans Fat Issue, Analysis of online consumer conversation to understand how the Oreo lawsuit impacted word-of-mouth on trans fats.", Aug. 16, 2004, 35 pages.

(Continued)

*Primary Examiner*—Etienne P LeRoux
(74) *Attorney, Agent, or Firm*—Hanley, Flight & Zimmerman, LLC

(57) ABSTRACT

An apparatus for providing an analysis of attitudes expressed in web content, comprising: a collector for collecting attitude-data in relation to a predetermined subject from one or more pre-selected web site, the attitude-data containing attitudes in relation to the predetermined subject; a processor, associated with the collector, for processing the attitude data so as to generate an attitude analysis; and an outputter, associated with the processor, for outputting the attitude analysis, thereby to provide an indication of attitudes being expressed in the web content in relation to the predetermined subject.

18 Claims, 22 Drawing Sheets
(16 of 22 Drawing Sheet(s) Filed in Color)

U.S. PATENT DOCUMENTS

| | | |
|---|---|---|
| 5,659,742 A | 8/1997 | Beattie et al. |
| 5,668,953 A | 9/1997 | Sloo |
| 5,671,333 A | 9/1997 | Catlett et al. |
| 5,675,710 A | 10/1997 | Lewis |
| 5,696,962 A | 12/1997 | Kupiec |
| 5,754,939 A | 5/1998 | Herz et al. |
| 5,761,383 A | 6/1998 | Engel |
| 5,794,412 A | 8/1998 | Ronconi |
| 5,819,285 A | 10/1998 | Damico et al. |
| 5,822,744 A | 10/1998 | Kesel |
| 5,836,771 A | 11/1998 | Ho et al. |
| 5,845,278 A | 12/1998 | Kirsch et al. |
| 5,857,179 A | 1/1999 | Vaithyanathan et al. |
| 5,884,302 A | 3/1999 | Ho |
| 5,895,450 A | 4/1999 | Sloo |
| 5,911,043 A | 6/1999 | Duffy et al. |
| 5,920,854 A | 7/1999 | Kirsch et al. |
| 5,924,094 A | 7/1999 | Sutter |
| 5,950,172 A | 9/1999 | Klingman |
| 5,950,189 A | 9/1999 | Cohen et al. |
| 5,953,718 A | 9/1999 | Wical |
| 5,974,412 A | 10/1999 | Hazlehurst et al. |
| 5,983,214 A | 11/1999 | Lang et al. |
| 5,983,216 A | 11/1999 | Kirsch et al. |
| 6,006,221 A | 12/1999 | Liddy et al. |
| 6,012,053 A | 1/2000 | Pant et al. |
| 6,021,409 A | 2/2000 | Burrows |
| 6,026,387 A | 2/2000 | Kesel |
| 6,026,388 A | 2/2000 | Liddy et al. |
| 6,029,161 A | 2/2000 | Lang et al. |
| 6,029,195 A | 2/2000 | Herz |
| 6,032,145 A | 2/2000 | Beall et al. |
| 6,035,294 A | 3/2000 | Fish |
| 6,038,610 A | 3/2000 | Belfiore et al. |
| 6,061,789 A | 5/2000 | Hauser et al. |
| 6,064,980 A | 5/2000 | Jacobi et al. |
| 6,067,539 A | 5/2000 | Cohen |
| 6,078,892 A | 6/2000 | Anderson et al. |
| 6,081,793 A | 6/2000 | Challener et al. |
| 6,094,657 A | 7/2000 | Hailpern et al. |
| 6,098,066 A | 8/2000 | Snow et al. |
| 6,112,203 A | 8/2000 | Bharat et al. |
| 6,119,933 A | 9/2000 | Wong et al. |
| 6,138,113 A | 10/2000 | Dean et al. |
| 6,138,128 A | 10/2000 | Perkowitz et al. |
| 6,169,986 B1 | 1/2001 | Bowman et al. |
| 6,185,558 B1 | 2/2001 | Bowman et al. |
| 6,192,360 B1 | 2/2001 | Dumais et al. |
| 6,202,068 B1 | 3/2001 | Kraay et al. |
| 6,233,575 B1 | 5/2001 | Agrawal |
| 6,236,977 B1 | 5/2001 | Verba et al. |
| 6,236,987 B1 | 5/2001 | Horowitz et al. |
| 6,236,991 B1 | 5/2001 | Frauenhofer et al. |
| 6,260,041 B1 | 7/2001 | Gonzalez |
| 6,266,664 B1 | 7/2001 | Russell-Falla et al. |
| 6,269,362 B1 | 7/2001 | Broder et al. |
| 6,278,990 B1 | 8/2001 | Horowitz |
| 6,289,342 B1 | 9/2001 | Lawrence et al. |
| 6,304,864 B1 | 10/2001 | Liddy et al. |
| 6,308,176 B1 | 10/2001 | Bagshaw |
| 6,314,420 B1 | 11/2001 | Lang et al. |
| 6,324,648 B1 | 11/2001 | Grantges, Jr. |
| 6,334,131 B2 | 12/2001 | Chakrabarti et al. |
| 6,360,215 B1 | 3/2002 | Judd et al. |
| 6,362,837 B1 | 3/2002 | Ginn |
| 6,366,908 B1 | 4/2002 | Chong et al. |
| 6,377,946 B1 | 4/2002 | Okamoto et al. |
| 6,385,586 B1 | 5/2002 | Dietz |
| 6,393,460 B1 | 5/2002 | Gruen et al. |
| 6,401,118 B1 | 6/2002 | Thomas |
| 6,411,936 B1 | 6/2002 | Sanders |
| 6,418,433 B1 | 7/2002 | Chakrabarti et al. |
| 6,421,675 B1 | 7/2002 | Ryan et al. |
| 6,434,549 B1 | 8/2002 | Linetsky et al. |
| 6,493,703 B1 | 12/2002 | Knight et al. |
| 6,507,866 B1 | 1/2003 | Barchi |
| 6,510,513 B1 | 1/2003 | Danieli |
| 6,513,032 B1 | 1/2003 | Sutter |
| 6,519,631 B1 | 2/2003 | Rosenschein et al. |
| 6,526,440 B1 | 2/2003 | Bharat |
| 6,539,375 B2 | 3/2003 | Kawasaki |
| 6,546,390 B1 | 4/2003 | Pollack et al. |
| 6,553,358 B1 | 4/2003 | Horvitz |
| 6,571,234 B1 | 5/2003 | Knight et al. |
| 6,571,238 B1 | 5/2003 | Pollack et al. |
| 6,574,614 B1 | 6/2003 | Kesel |
| 6,584,470 B2 | 6/2003 | Veale |
| 6,606,644 B1 | 8/2003 | Ford et al. |
| 6,622,140 B1 | 9/2003 | Kantrowitz |
| 6,640,218 B1 | 10/2003 | Golding et al. |
| 6,651,086 B1 | 11/2003 | Manber et al. |
| 6,654,813 B1 | 11/2003 | Black et al. |
| 6,658,389 B1 | 12/2003 | Alpdemir |
| 6,662,170 B1 | 12/2003 | Dom |
| 6,678,516 B2 | 1/2004 | Nordman et al. |
| 6,708,215 B1 | 3/2004 | Hingorani et al. |
| 6,721,734 B1 | 4/2004 | Subasic et al. |
| 6,751,606 B1 | 6/2004 | Fries et al. |
| 6,751,683 B1 | 6/2004 | Johnson et al. |
| 6,757,646 B2 | 6/2004 | Marchisio |
| 6,772,141 B1 | 8/2004 | Pratt et al. |
| 6,775,664 B2 | 8/2004 | Lang et al. |
| 6,778,975 B1 | 8/2004 | Anick et al. |
| 6,782,393 B1 | 8/2004 | Balabanovic et al. |
| 6,795,826 B2 | 9/2004 | Flinn et al. |
| 6,807,566 B1 | 10/2004 | Bates et al. |
| 6,889,325 B1 | 5/2005 | Sipman et al. |
| 6,892,944 B2 | 5/2005 | Chung et al. |
| 6,928,526 B1 | 8/2005 | Zhu et al. |
| 6,978,292 B1 | 12/2005 | Murakami et al. |
| 6,983,320 B1 * | 1/2006 | Thomas et al. .............. 709/224 |
| 6,999,914 B1 | 2/2006 | Boerner et al. |
| 7,043,760 B2 | 5/2006 | Holtzman et al. |
| 7,117,368 B2 | 10/2006 | Sako |
| 7,146,416 B1 | 12/2006 | Yoo |
| 7,188,078 B2 | 3/2007 | Arnett et al. |
| 7,188,079 B2 | 3/2007 | Arnett et al. |
| 7,197,470 B1 | 3/2007 | Arnett et al. |
| 7,277,919 B1 | 10/2007 | Donoho |
| 7,422,150 B2 | 9/2008 | Chung |
| 7,431,209 B2 | 10/2008 | Kevin Kwong-Tai Chung |
| 2001/0011351 A1 | 8/2001 | Sako |
| 2001/0018858 A1 | 9/2001 | Dwek |
| 2001/0020228 A1 | 9/2001 | Cantu et al. |
| 2001/0034708 A1 | 10/2001 | Walker et al. |
| 2001/0042087 A1 | 11/2001 | Kephart et al. |
| 2002/0010691 A1 | 1/2002 | Chen |
| 2002/0019764 A1 | 2/2002 | Mascarenhas |
| 2002/0032772 A1 | 3/2002 | Olstad et al. |
| 2002/0059258 A1 | 5/2002 | Kirkpatrick |
| 2002/0087515 A1 | 7/2002 | Swannack |
| 2002/0103801 A1 | 8/2002 | Lyons |
| 2002/0123988 A1 | 9/2002 | Dean et al. |
| 2002/0133481 A1 | 9/2002 | Smith et al. |
| 2002/0159642 A1 | 10/2002 | Whitney |
| 2003/0034393 A1 | 2/2003 | Chung |
| 2003/0046144 A1 | 3/2003 | Clark et al. |
| 2003/0062411 A1 | 4/2003 | Chung et al. |
| 2003/0070338 A1 | 4/2003 | Roshkoff |
| 2003/0088532 A1 | 5/2003 | Hampshire |
| 2003/0094489 A1 | 5/2003 | Wald |
| 2003/0173404 A1 | 9/2003 | Chung et al. |
| 2004/0024752 A1 | 2/2004 | Manber et al. |
| 2004/0059708 A1 | 3/2004 | Dean et al. |

| | | | |
|---|---|---|---|
| 2004/0059729 A1 | 3/2004 | Krupin et al. | |
| 2004/0078432 A1 | 4/2004 | Manber et al. | |
| 2004/0111412 A1 | 6/2004 | Broder | |
| 2004/0122811 A1 | 6/2004 | Page | |
| 2004/0181675 A1 | 9/2004 | Hansen | |
| 2004/0199498 A1 | 10/2004 | Kapur et al. | |
| 2004/0205482 A1 | 10/2004 | Basu et al. | |
| 2004/0210561 A1 | 10/2004 | Shen | |
| 2005/0049908 A2 | 3/2005 | Hawks | |
| 2005/0114161 A1 | 5/2005 | Garg et al. | |
| 2005/0125216 A1 | 6/2005 | Chitrapura et al. | |
| 2005/0154686 A1 | 7/2005 | Corston et al. | |
| 2006/0004691 A1 | 1/2006 | Sifry | |
| 2006/0015737 A1 | 1/2006 | Canard et al. | |
| 2006/0041605 A1 | 2/2006 | King et al. | |
| 2006/0069589 A1 | 3/2006 | Nigam et al. | |
| 2006/0173819 A1* | 8/2006 | Watson | 707/3 |
| 2006/0173837 A1 | 8/2006 | Berstis et al. | |
| 2006/0206505 A1 | 9/2006 | Hyder et al. | |
| 2007/0027840 A1 | 2/2007 | Cowling et al. | |
| 2007/0143853 A1 | 6/2007 | Tsukamoto | |
| 2007/0282621 A1 | 12/2007 | Altman et al. | |
| 2008/0059791 A1 | 3/2008 | Lee et al. | |
| 2008/0262920 A1 | 10/2008 | O'Neill et al. | |

OTHER PUBLICATIONS

"Delahaye Group to Offer NetBench: High Level Web-Site Qualitative Analysis and Reporting; NetBench Builds on Systems Provided by I/PRO and Internet Media Services", 1995 business Wire, Inc., May 31, 2995, 3 pages.

International Bureau, "International Preliminary Report on Patentability," from corresponding International Patent Application No. PCT/IL2006/000905, mailed on Jul. 2, 2007, (5 pages).

David Chaum & Jan-Hendrik Evertse, "A Secure and Privacy-Protecting Protocol for Transmitting Personal Information Between Organizations", A.M. Odlyzko (Ed.): Advances in Cryptology, Crypto '86, LNCS 263, 1987, pp. 118-167.

David L. Chaum, "Untraceable Electronic Mail, Return Addresses, and Digital Pseudonymns", Communication of the ACM, vol. 24, No. 2, 1981, pp. 84-88.

European Search Report dated Sep. 26, 2007, directed to counterpart EP application No. 02744622.8, 3 pages.

eWatch's archived web site retrieved from [URL:http://web.archive.org/web/19980522190526/wwww.ewatch.com] on Sep. 8, 2004, archived May 22, 1998.

Housley et al., "Internet X.509 Public Key Infrastructure Certificate and CRL Profile", Jan. 1999, Network Working Group Request for Comments: 2459, pp. 1-129.

International Bureau, "International Preliminary Report on Patentability", from corresponding International Patent Applicaton No. PCT/IL2006/000905, mailed on Jul. 2, 2007, (5 pages).

International Search Report dated Jul. 1, 2008, in WO PCT/US2007/021035, 3 pages.

Interview Summary in U.S. Appl. No. 11/651,661, date mailed, May 6, 2009, 2 pages.

IPRP dated Jun. 19, 2007, in WO PCT/US2005/035321, 4 pages.

Kahn et al., Categorizing Web Documents using Competitive Learning;An ingredient of a Personal Adaptive Agent, IEEE;c 1997.

McLachlan, Geoffrey J. and Krishnan, Thriyambakam, The EM Algorithm and Extensions, Copyright 1997, pp. 1-274, John Wiley & Sons, Inc., New York, USA.

Nakashima et al., Information Filtering for the Newspaper, IEE; c1997.

Needel, Word of Mouth Research Case Study, "The Trans Fat Issue, Analysis of online consumer conversation to understand hwo the Oreo lawsuit impacted word-of-mouth on trans fats.", Aug. 16, 2004, 35 pages.

NetCurrent's web site, retrieved from [URL: http://web.archive.org/web/20000622024845/www/netcurrents.com] Jan. 17, 2005, archived on Jun. 22, 2000 and Sep. 18, 2000.

Official Action dated Apr. 7, 2009, in U.S. Appl. No. 11/454,301, 17 pages.

Official Action dated Apr. 21, 2009, in U.S. Appl. No. 11/897,984, 18 pages.

Official Action dated Apr. 23, 2008, in U.S. Appl. No. 11/364,169, 10 pages.

Official Action dated Apr. 28, 2005, in U.S. Appl. No. 09/879,220, 16 pages.

Official Action dated Apr. 29, 2009, in U.S. Appl. No. 10/801,758, 42 pages.

Official Action dated Apr. 5, 2006, in U.S. Appl. No. 11/239,632, 9 pages.

Official Action dated Apr. 7, 2006, in U.S. Appl. No. 11/239,695, 9 pages.

Official Action dated Aug. 19, 2008, in U.S. Appl. No. 11/517,418, 9 pages.

Official Action dated Aug. 21, 2008, in U.S. Appl. No. 11/245,542, 4 pages.

Official Action dated Aug. 3, 2007, in U.S. Appl. No. 11/651,661, 14 pages.

Official Action dated Aug. 7, 2008, in U.S. Appl. No. 11/710,742, 12 pages.

Official Action dated Dec. 1, 2006, in U.S. Appl. No. 09/879,220, 3 pages.

Official Action dated Dec. 12, 2004, in U.S. Appl. No. 09/879,220, 15 pages.

Official Action dated Dec. 16, 2008, in U.S. Appl. No. 11/245,542, 4 pages.

Official Action dated Dec. 18, 2006, in U.S. Appl. No. 11/239,632, 3 pages.

Official Action dated Dec. 23, 2008, in U.S. Appl. No. 11/372,191, 6 pages.

Official Action dated Dec. 3, 2006, in U.S. Appl. No. 11/239,695, 3 pages.

Official Action dated Dec. 4, 2008, in U.S. Appl. No. 11/651,661, 10 pages.

Official Action dated Dec. 8, 2008, in U.S. Appl. No. 11/710,742, 10 pages.

Official Action dated Feb. 24, 2003, in U.S Appl No. 09/796,961, 4 pages.

Official Action dated Jan. 12, 2009, in U.S. Appl. No. 11/710,743, 17 pages.

Official Action dated Jan. 21, 2009, in U.S. Appl. No. 11/897,984, 3 pages.

Official Action dated Jan. 24, 2007, in U.S. Appl. No. 09/686,516, 3 pages.

Official Action dated Jan. 28, 2005, in U.S. Appl. No. 09/686,516, 19 pages.

Official Action dated Jan. 30, 2009, in U.S. Appl. No. 11/710,742, 10 pages.

Official Action dated Jul. 10, 2008, in U.S. Appl. No. 11/364,169, 2 pages.

Official Action dated Jul. 21, 2004, in U.S. Appl. No. 09/695,016, 27 pages.

Official Action dated Jul. 29, 2008, in U.S. Appl. No. 11/710,743, 12 pages.

Official Action dated Jun. 11, 2007, in U.S. Appl. No. 11/364,169, 8 pages.

Official Action dated Jun. 12, 2008, in U.S. Appl. No. 11/245,542, 9 pages.

Official Action dated Jun. 29, 2005, in U.S. Appl. No. 09/686,516, 21 pages.

Official Action dated Jun. 4, 2008, in U.S. Appl. No. 11/651,661, 11 pages.

Official Action dated Mar. 28, 2006, in U.S. Appl. No. 09/879,220, 19 pages.

Official Action dated Mar. 7, 2008, in U.S. Appl. No. 10/801,758, 31 pages.

Official Action dated May 10, 2006, in U.S. Appl. No. 09/686,516, 34 pages.

Official Action dated May 19, 2005, in U.S. Appl. No. 09/695,016, 13 pages.

Official Action dated May 22, 2008, in U.S. Appl. No. 11/897,984, 17 pages.

Official Action dated Nov. 13, 2008, in U.S. Appl. No. 11/897,984, 20 pages.
Official Action dated Nov. 2, 2005, in U.S. Appl. No. 09/695,016, 13 pages.
Official Action dated Nov. 21, 2007, in U.S. Appl. No. 11/239,696, 3 pages.
Official Action dated Nov. 22, 2005, in U.S. Appl. No. 09/686,516, 25 pages.
Official Action dated Oct. 1, 2008, in U.S. Appl. No. 10/801,758, 40 pages.
Official Action dated Oct. 3, 2007, in U.S. Appl. No. 11/710,742, 10 pages.
Official Action dated Oct. 8, 2008, in U.S. Appl. No. 11/245,542, 5 pages.
Official Action dated Oct. 9, 2007, in U.S. Appl. No. 11/245,542, 11 pages.
Official Action dated Sep. 12, 2007, in U.S. Appl. No. 11/239,696, 8 pages.
Official Action dated Sep. 18, 2008, in U.S. Appl. No. 11/454,301, 17 pages.
Official Action dated Sep. 21, 2006, in U.S. Appl. No. 11/239,632, 3 pages.
Official Action dated Sep. 21, 2006, in U.S. Appl. No. 11/239,695, 3 pages.
Official Action dated Sep. 22, 2006, in U.S. Appl. No. 11/239,696, 11 pages.
Page 34 of archived version of www.zagat.com, Feb. 1999.
Trigaux, Robert. "Cyberwar Erupts Over Free Speech Across Florida, Nation."Knight-Ridder Tribune Business News, May 29, 2000.
Written Opinion of International Search Report issued in PCT US2007 021035, date mailed Apr. 9, 2009, 9 pages.
Adamic et al., The political blogosphere and the 2004 U.S. election: Divided they blog, Proceedings WWW-2005 2nd Annual Workshop on the Weblogging Ecosystem, 2005, Chiba, Japan.
Adar et al., Implicit structure and dynamics of blogspace, Proceedings WWW-2004 Workshop on the Weblogging Ecosystem, 2004, New York, NY.
Aliod, Diego Molla, et al., "A Real World Implementation of Answer Extraction", Department of Computer Science, University of Zurich, Winterthurerstr., 1998, 190, Ch- 8057 Zurich, Switzerland, pp. 1-6.
Archived version of www.bizrate.com, Jan. 1999.
Bishop, Mike, "Arrow Question/Answering Systems", Language Computer Corporation, 1999, pp. 1-3.
Blum, Avrim, "Empirical support for winow and weighted-majority algorithms: Results on a calendar scheduling domain," in Machine Learing, 1997, pp. 5-23, vol. 26, Kluwer Academic Publishers, Boston, USA.
Cohen, William W., "Data Integration using similarity joins and a word-based information representation language," in ACM Transactions on Information Systems, Jul. 2000, pp. 288-321, vol. 18, No. 3.
Cohn et al., "Active Learning with Statistical Models" , Journal of Artificial Intelligence Research 4 (1996), 129-145, AI Access Foundation and Morgan Kaufmann Publishers, USA.
Dagan et al., "Mistake Driven learning in text categorization," in EMNLP '97, 2nd Conference on Empirical Methods in Natural Language Processing, 1997.
Dillon et al., Marketing research in a Marketing Environment, 1987, Times Mirror/Mosby College, USA, pp. 98, 286, 288.
Farber, Dave. "IP: eWatch and Cybersleuth," Jun. 29, 2000, retrieved from [URL: http://www.interesting-people.org/archives/interesting-people/200006/msg00090.html].
Freund et al., "Selective Sampling Using the Query by Committee Algorithm", Machine Learning 28 (1997), 133-168, Kluwer Academic Publishers, The Netherlands.
Glance et al., Analyzing online disussion for marketing intelligence, Proceedings WWW-2005 2nd Annual Workshop on the Weblogging Ecosystem, 2005, Chiba, Japan.
Glance et al., Deriving marketing intelligence from online discussion, 11th ACM SIGKDD International Conf. On Knowledge Discovery and Data Mining, Aug 21-24, 2005, Chicago, IL.
Greffenstette et al., "Validating the coverage of lexical resources for affect analysis and automatically classifying new words along semantic axes," Chap. X, Mar. 2004, pp. 1-15.
Harabagiu, Sanda M. et al., "Experiments with Open-Domain Textual Question Asnwering", Department of Computer Science and Engineering at Southern Methodist Universtity, 2000, pp. 1-7.
Harabagiu, Sanda M. et al., "Mining Textual Answers with Knowledge-Based Indicators", Department of Computer Science and Engineering at Southern MethodistC University, 2000, pp. 1-5.
Harabagiu, Sanda M., "An Intelligent System for Question Answering", University of Southern California; Modlovan, Dan, Southern Methodist University, 2004, pp. 1-5.
Joachims, Thorsten, "Text categorization with support vector machines: Learning with many relevant features," in Machine Learning: ECML-98, Tenth European Conference on Machine Learning, pp. 137-142, 1998.
Katz, Boris, "From Sentence Processing to Information Access on the World Wide Web: Start Information Server", MIT Artificial Intelligence Laboratory, Feb. 27, 1997.
Kleppner, Advertising Procedure, 6th edition, 1977, Prentice-Hall, Inc., Englewood Cliffs, NJ, p. 492.
Kotler, Marketing Management, 1997, PrenticeHall International Inc., Upper Saddle River, NJ, pp. 617-619, 656-658, 665-667.
Lenz, Mario, et al., "Question answering with Textual CBR", Department of Computer Science, Humboldt University Berlin, D-10099 Berlin, pp. 1-12, 1998.
Littlestone, Nick, "Learning quickly when irrelevant attributes abound: A new linearthreshold algorithm," in Machine Learning, 1988, pp. 285-318, vol. 2, Kluwer Academic Publishers, Boston, USA.
Marlow, Audience, structure and authority in the weblog community, International Communication Association Conference, MIT Media Laboratory, 2004, New Orleans, LA.
McCallum et al., "Text Classification by Bootstrapping with the Keywords, EM and Shrinkage", Just Research and Carnegie Mellon U., circa 1999, Pittsburgh, PA, USA.
Modlovan, Dan et al., "LASSO: A Tool for Surfing the Answer Net", Department of Computer Science and Engineering at Southern Methodist University, pp. 1-9, 1999.
Nanno et al., Automatic collection and monitoring of Japanese Weblogs, Proceedings WWW-2004 Workshop on the weblogging Ecosystem, 2004, New York, NY.
Pang et al., "Thumbs up? Sentiment classification using machine learning techniques," in Proceedings of EMNLP 2002,2002.
Reinartz, Customer Lifetime Value Analysis: An Integrated Empirical Framework for Measurement and Explanation, dissertation: Apr. 1999, pp. 57-118.
Thomas, International Marketing, 1971, International Textbook Company, Scranton, PA, p. 148.
Tull et al., Marketing Research Measurement and Method, 1984, MacMillan Publishing Company, New York, NY, pp. 102, 103, 114, 115, 200 201 and 256.
Voorhees, Ellen M., "The TREC-8 Question Answering Track Report", National Institute of Standards and Technology, pp. 1-6, 1999.
Wiebe et al., "Identifying collocations for recognizing opinions, in proceedings of ACL/EACL '01 workshop on collcation," (Toulouse, France), Jul. 2001.
www.dialogic.com as archived on May 12, 2000.
www.zagat.com archived on Apr. 29, 1999.
Yang, Yiming, "An evaluation of statistical approacches to text categorization," Information Retrieval 1(1/2), pp. 67-88, 1999.
Notice of Allowance issued in U.S. Appl. No. 11/710,742, mailed Jun. 8, 2009.
Notice of Allowance issued in U.S. Appl. No. 11/651,661, mailed May 19, 2009.
United States Patent and Trademark Office, "Non-Final Office Action," issued in connection with U.S. Appl. No. 11/710,743, on Aug. 7, 2009 (19 pages).
Reguly, Eric, "Caveat Emptor Rules on the Internet," The Globe and Mail (Canada): Report on Business Column, p. B2, Apr. 10, 1999 (2 pages).

* cited by examiner

```
<[1]community name="DVDTalk">
  <[1]forum name="DVD Exchange">
    <[1]title> Cover Art for Red Dwarf V&VI <[1]/title>
    <[1]date>1/30/2005 12:15:00 AM<[1]/date>
    <[1]author>jadedapathy<[1]/author>
    <[1]body> Does anyone have or know where I can find the cover-art for series 5 and 6 of Red Dwarf? I'm new here but I am willing to pay and/or trade for the cover-art for these two as I've been unable to obtain it anywhere so far.

Thanks,
    Jay_D
    <[1]/body>
  </[1]forum>
</[1]community>
```

710 — `<[1]community name="DVDTalk">`
720 — `<[1]title> Cover Art for Red Dwarf V&VI <[1]/title>`
730 — `<[1]date>1/30/2005 12:15:00 AM<[1]/date>`
740 — `<[1]author>jadedapathy<[1]/author>`
750 — `<[1]body>`
760 — body content

Figure 12

Title: //tr[td[2]/div[1]/a[1]/strong[1]][td[3]/div[1]/div[3]][td[2]/div[1]/a[1]/strong[1]]

Figure 13

Element_paths_collection = get all absolute paths to extracted elements on page

Common_path = first_element_full_path

Foreach element_path in Element_paths_collection do

Common_path = Find_common_path_between(element_path, Common_path)

End foreach

Figure 21

Find k most relevant words // either most frequent, or highest relevance in the //collection (based on distance metric described above Run density-word clustering algorithm Build distance matrix for all words Find most "dense" word //(with most close words)

Merge 2 closest words into one cluster

Repeat until no close word to merge

Fill relevant messages/documents to each word cluster

METHOD AND SYSTEM FOR EXTRACTING WEB DATA

RELATED APPLICATIONS

This application is a division of U.S. patent application Ser. No. 11/364,169, filed on Mar. 1, 2006, which claims the benefit of U.S. Provisional Patent Application No. 60/705,442, filed on Aug. 5, 2005, the contents of which are hereby incorporated by reference.

FIELD AND BACKGROUND OF THE INVENTION

The present invention relates generally to an apparatus and method for public attitude analysis. More particularly but not exclusively, the present invention relates to an apparatus and a method for extracting and analyzing public attitude relevant data.

Modern organizations spend billions of dollars on Public Relations (PR) and advertisement campaigns in order to bring to the public a message, create a positive atmosphere, and influence stakeholders, opinion leaders and customers.

However, measuring the impact imposed by such campaigns on the public is very difficult.

Traditional methods for measuring or predicting the impact imposed by public campaigns on the public are inherently limited.

For example, Consumer marketing research includes both attitudinal and behavioral market research. Consumer marketing research generally refers to the study of consumers and their purchasing habits and activities.

Attitudinal research generally includes studies that focus on understanding consumers and how consumers make purchasing decisions. Attitudinal research can be defined as research that represents a person's ideas, convictions or liking with respect to a specific object or idea. Opinions are essentially expressions of attitudes. Consequently, attitudes and opinions can be used almost interchangeably to represent a person's ideas, convictions or liking with respect to a specific object or idea. Collecting consumer purchasing information allows, for example, product manufacturers, to drill down to human purchasing dispositions. Attitudinal research may assist in determining the likelihood of product purchase, how future products can be improved, whether product changes are acceptable, etc.

Behavioral research can be defined as the study of consumer behavior. Behavioral research studies what people do, that is, how people act.

Behavioral data, reflecting what consumers actually purchase in the marketplace, as opposed to what researchers infer consumers will or will not purchase, has always been available. However, comprehensive behavioral data is not always easy to capture for a variety of reasons.

The field of consumer marketing research which includes attitudinal and behavioral market research requires gathering data related to, for example, consumer attitudes and consumer behavior, in order to analyze such attitudes and behavior. Consumer data may be gathered through the distribution of incentive items activated via participation in consumer research programs and consumer surveys, such as the ones described in U.S. Patent Publication 20030070338, entitled: "Removable label and incentive item to facilitate collecting consumer data". However, incentive based methods may produce biased results.

Prior art methods for measuring public attitudes include conducting polls on a presumably representative sample of target audiences. For example, U.S. Pat. No. 3,950,618 entitled: "System for Public Opinion research" describes an automatic system for processing a public opinion poll. However, such methods are based on an assumption that such samples are indeed representative of the target audiences.

Another popular prior art method for evaluating public attitudes which is very often employed involves focus group techniques. A focus group is a group of people, presumed to be representative of a target population, such as parents or customers, gathered to provide answers to open-ended questions on specific topics and share their opinions.

Prior Art lacks methods for capturing public attitudes which do not rely on the careful selection of a representative sample or the actual behavior and the availability of comprehensive data pertaining to the actual behavior.

Prior art has so far failed to incorporate public attitude spread by word of mouth, specifically as far as the Internet is concerned. The web added a new dimension to the media mix—online news groups, discussion groups, forums, chats and blogs—are all forms of communications that did not exist ten years ago, and today they are an inseparable part of the media mix. The public is an inseparable part of the media. The public is fed from the media and feeds the media through its new means of communication.

There is thus a widely recognized need for, and it would be highly advantageous to have an apparatus and method for extracting and analyzing public attitude data which is devoid of the above limitations.

SUMMARY OF THE INVENTION

According to one aspect of the present invention there is provided an apparatus for providing an analysis of attitudes expressed in web sites, comprising: a collector for collecting attitude-data in relation to a predetermined subject from at least one pre-selected web site, the attitude-data containing attitudes in relation to the predetermined subject, a processor, associated with the collector, for processing the attitude data so as to generate an attitude analysis, and an outputter, associated with the processor, for outputting the attitude analysis, thereby to provide an indication of attitudes being expressed in the web content in relation to the predetermined subject.

According to a second aspect of the present invention there is provided an apparatus for crawling web content to provide data for attitude analysis of attitudes expressed in the web content in relation to a predetermined subject, the apparatus comprising a crawler, configured to crawl a plurality of pre-selected web sites, for collecting attitude-data from the web sites, the attitude data comprising attitudes relating to the predetermined subject, the crawler being further configured to provide the attitude data to a predetermined location for the attitude analysis.

According to a third aspect of the present invention there is provided a method for analyzing attitudes expressed in web content, the attitudes being in relation to a predetermined subject, comprising: automatically collecting attitude data from at least one pre-selected web site, the attitude-data expressing a plurality of attitudes in relation to the predetermined subject, electronically processing the attitude data so as to generate attitude information indicative of the plurality of attitudes, and outputting the attitude-information, thereby to provide an analysis of the attitudes in relation to the predetermined subject.

According to a fourth aspect of the present invention there is provided a device for interactive setting of a data collection policy using a web page display, comprising a web page displayer, for displaying a web page to a user, operable for defining a data collection policy in relation to the web page. Preferably, the device's web page displayer is further operable to define a specific data collection policy in relation to a respective region of the web page.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The file of this patent contains at least one drawing executed in color photograph. Copies of this patent with color photograph(s) will be provided by the Patent and Trademark Office upon request and payment of necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a block diagram of an apparatus for analyzing attitudes expressed in web sites, according to a preferred embodiment of the present invention;

FIG. 2 is a detailed block diagram of an apparatus for analyzing attitudes expressed in web sites, according to a preferred embodiment of the present invention;

FIG. 3 is an exemplary main forum web page;

FIG. 4 is an exemplary forum header web page;

FIG. 5 shows an exemplary message header page;

FIG. 6 is a flow chart illustrating an implementation of a predefined collecting policy for a specific forum web site, according to a preferred embodiment of the present invention;

FIG. 7 shows an exemplary XML format parsed attitude-data bearing page representation, according to a preferred embodiment of the present invention;

FIG. 8 is a block diagram illustrating an apparatus for collecting attitude-data from web site(s) according to a preferred embodiment of the present invention;

FIG. 9 shows an exemplary collecting policy definer graphical user interface (GUI), according to a preferred embodiment of the present invention;

FIG. 10 shows an exemplary Web site page;

FIG. 11 shows an exemplary user marked Web site page, according to a preferred embodiment of the present invention;

Figure 14:
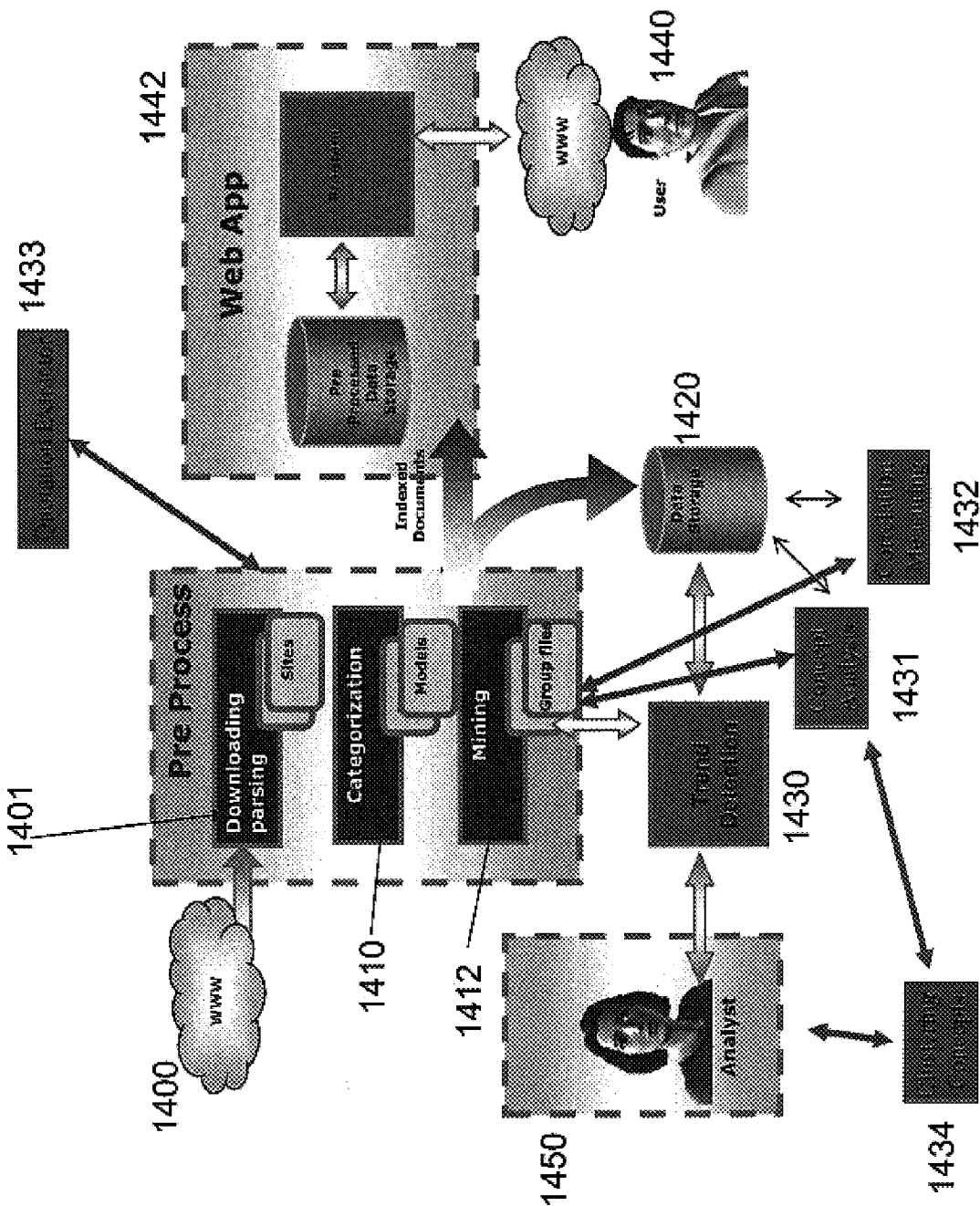
Figure 15:
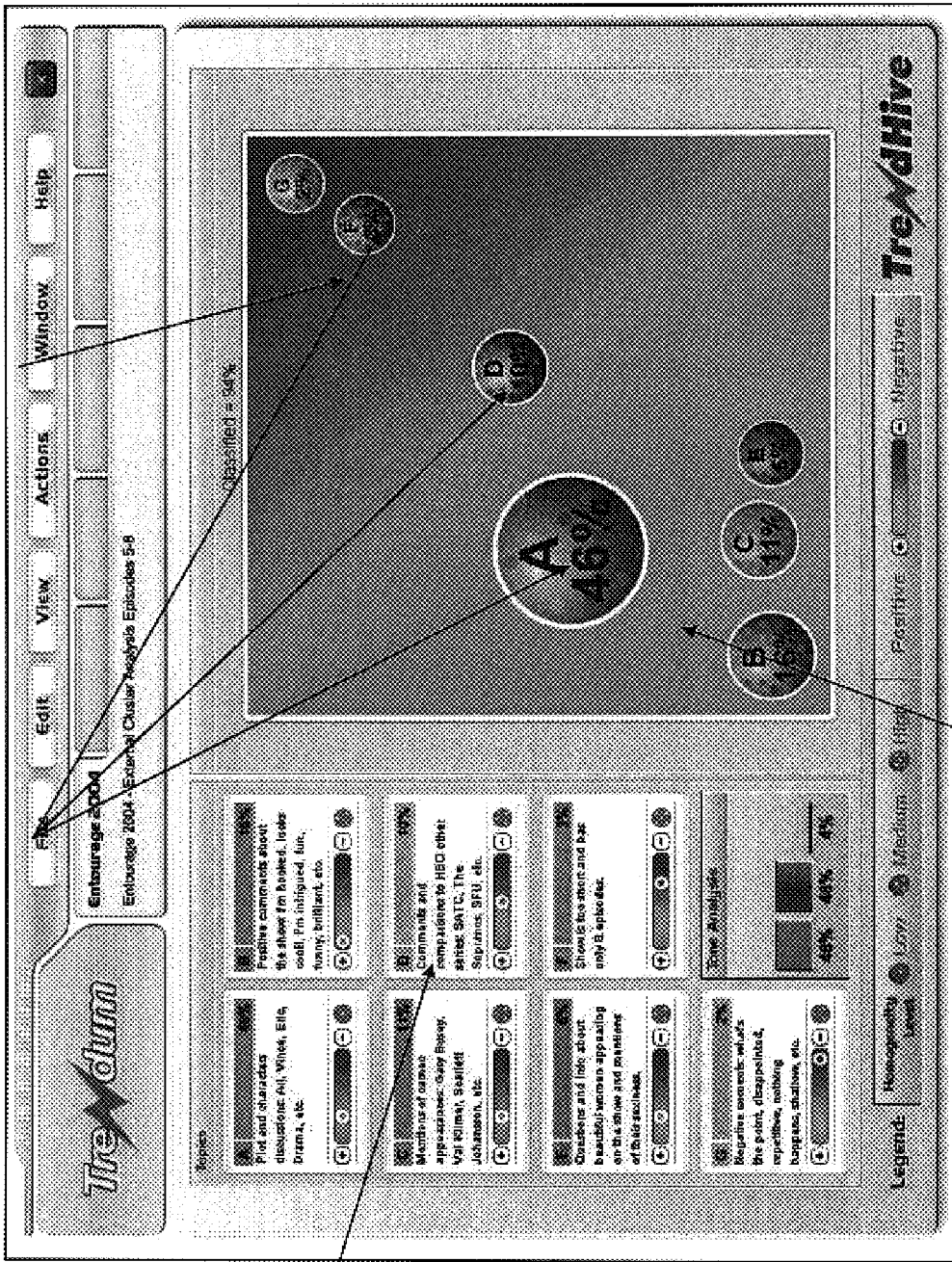
Figure 16:
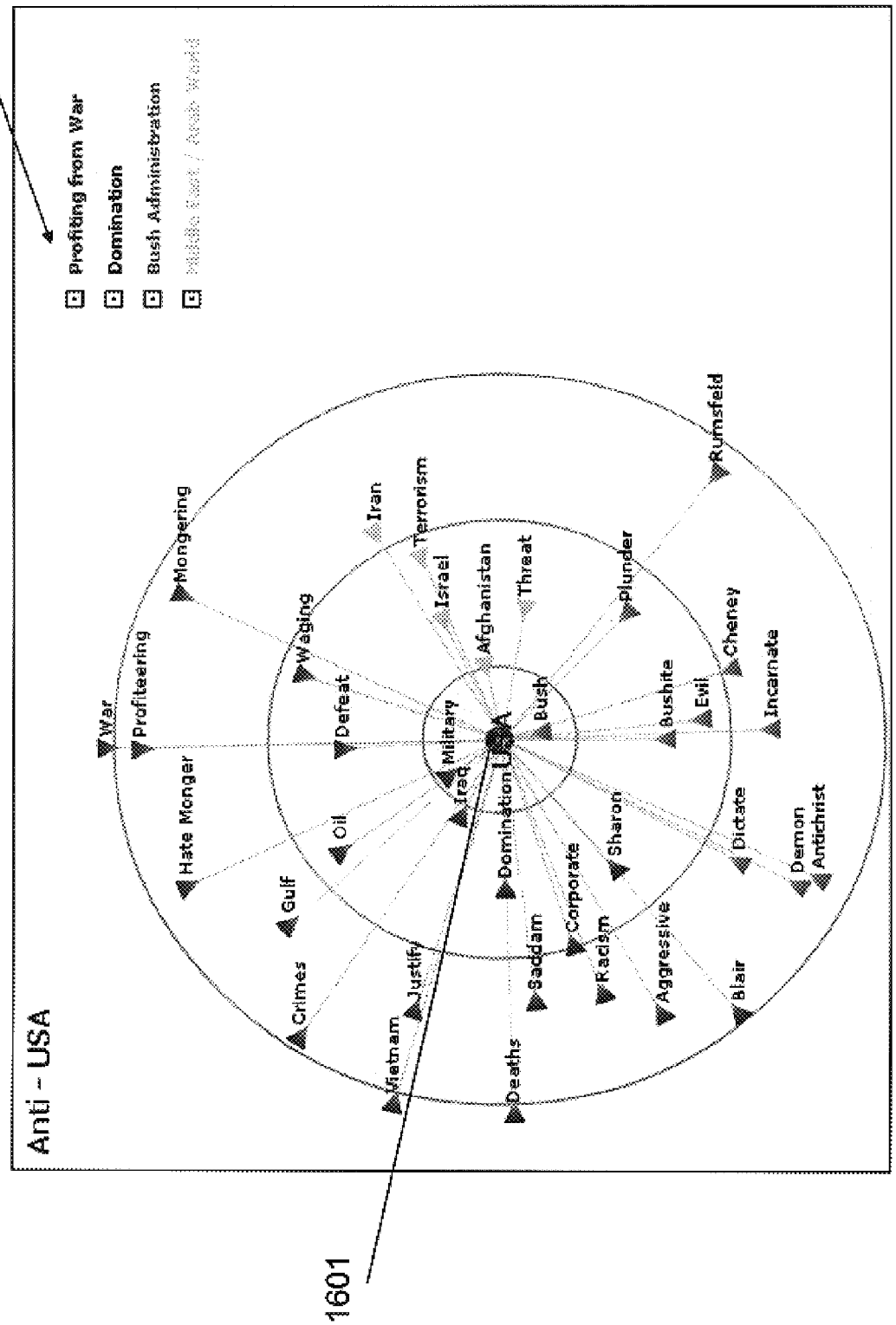
Figure 17:
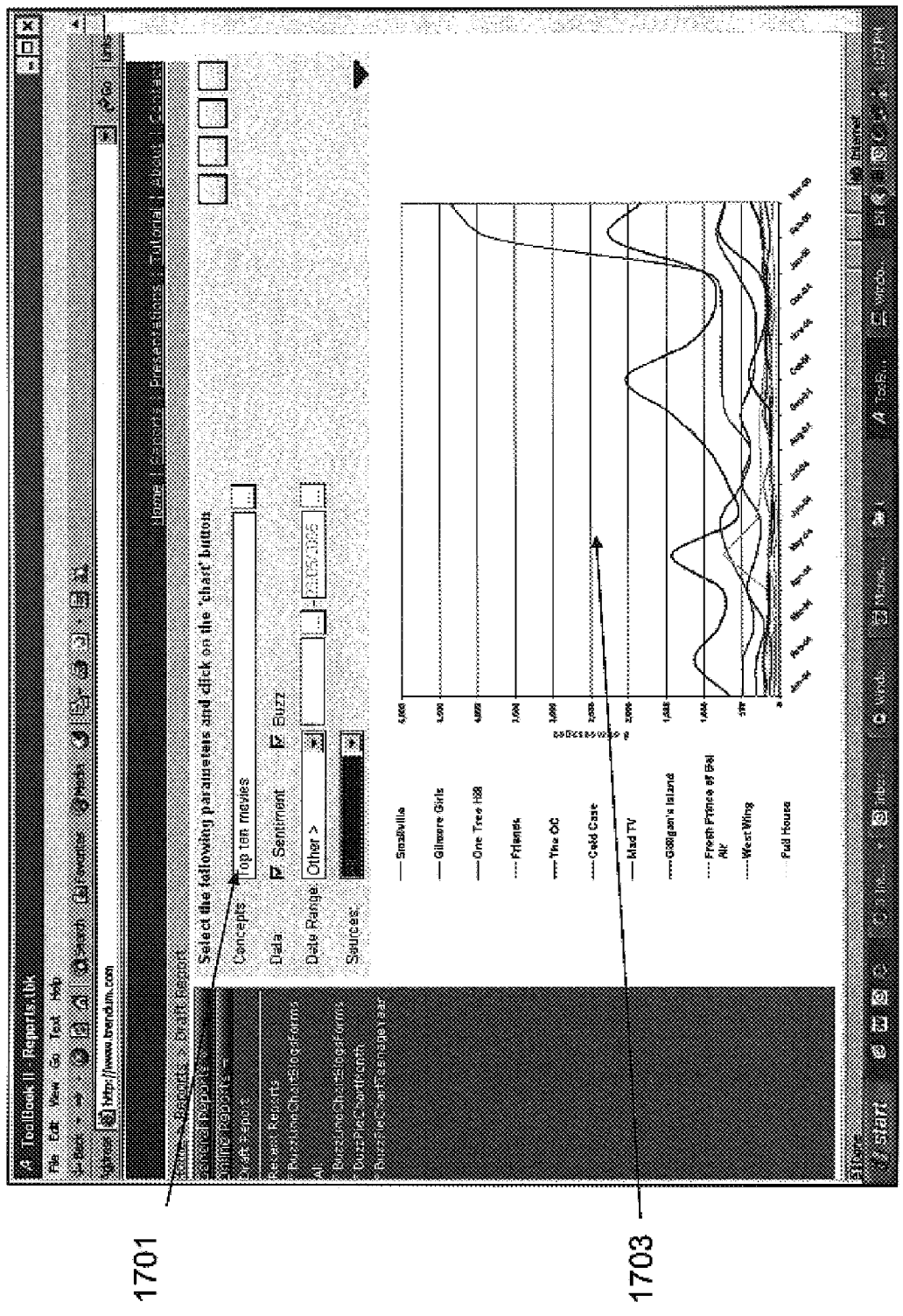
Figure 18:
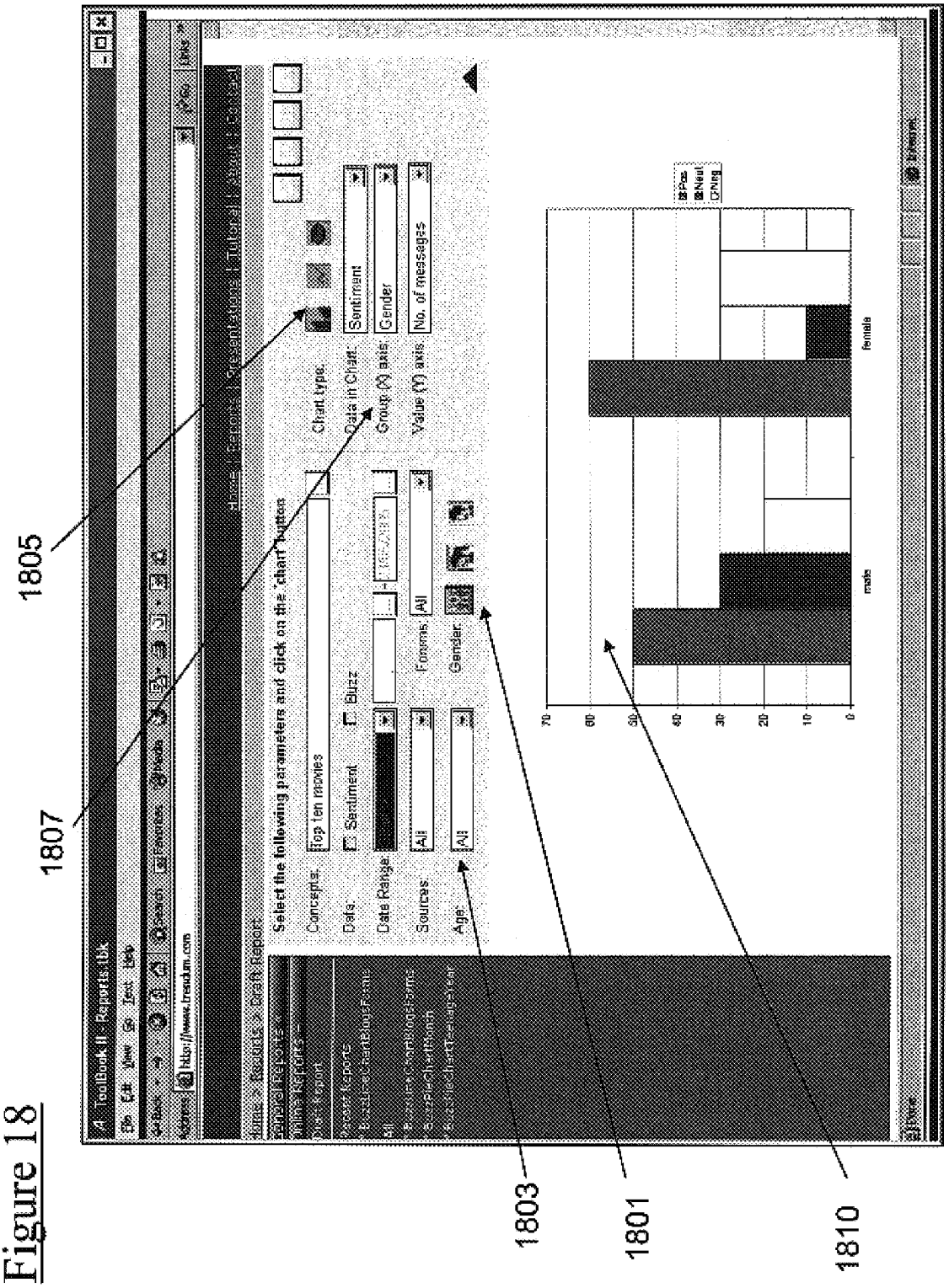
Figure 19:
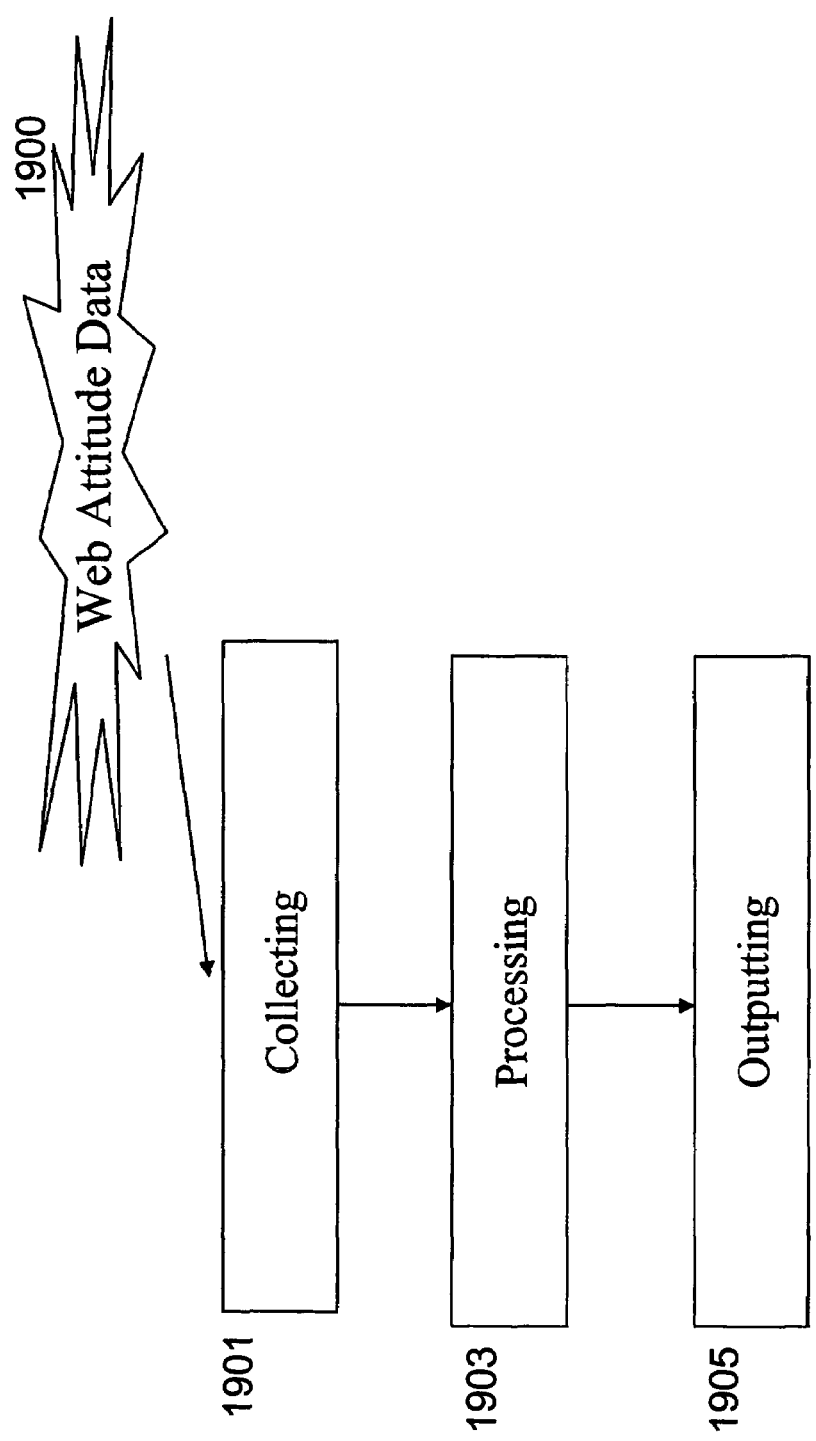
Figure 20:
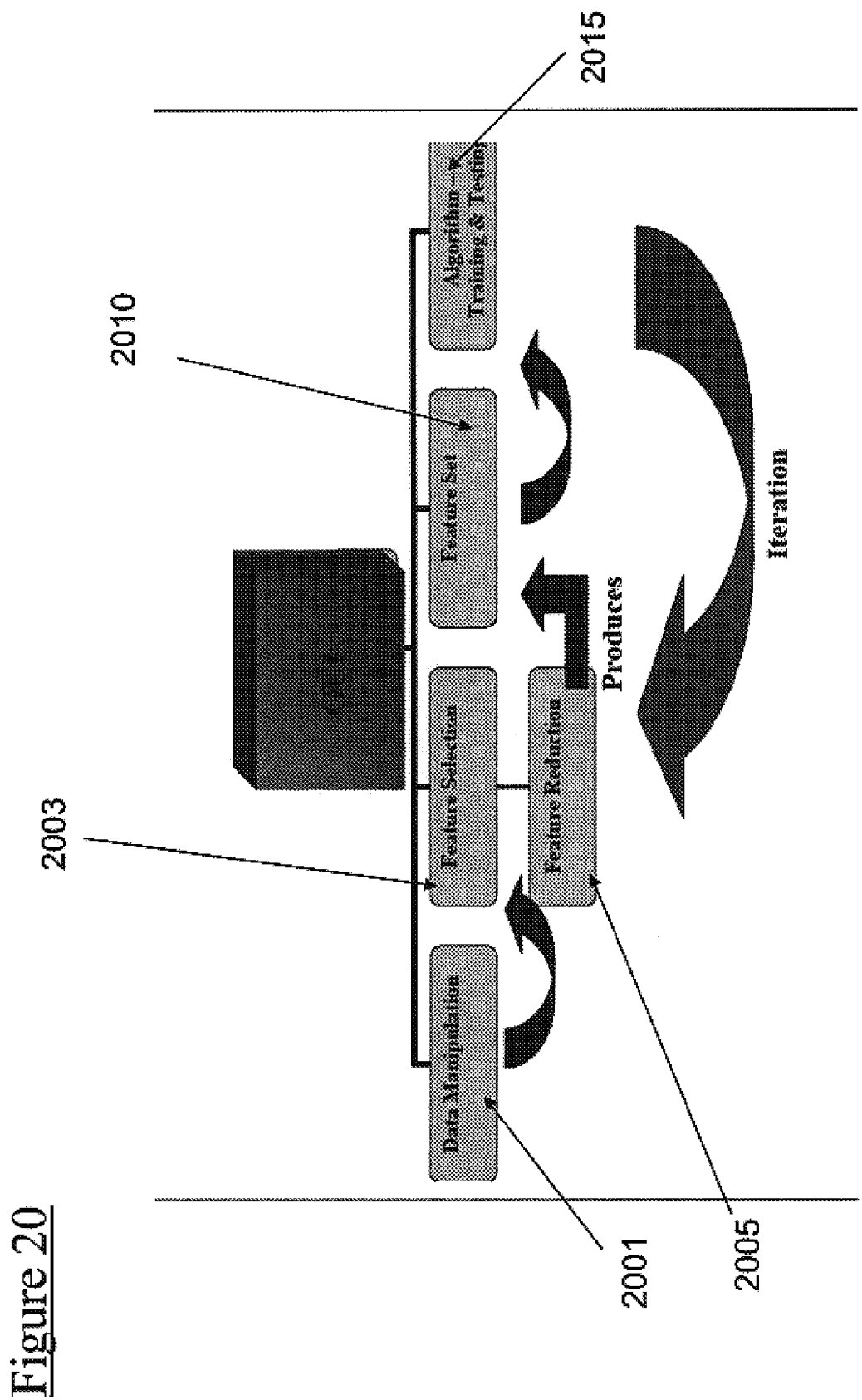
Figure 22:
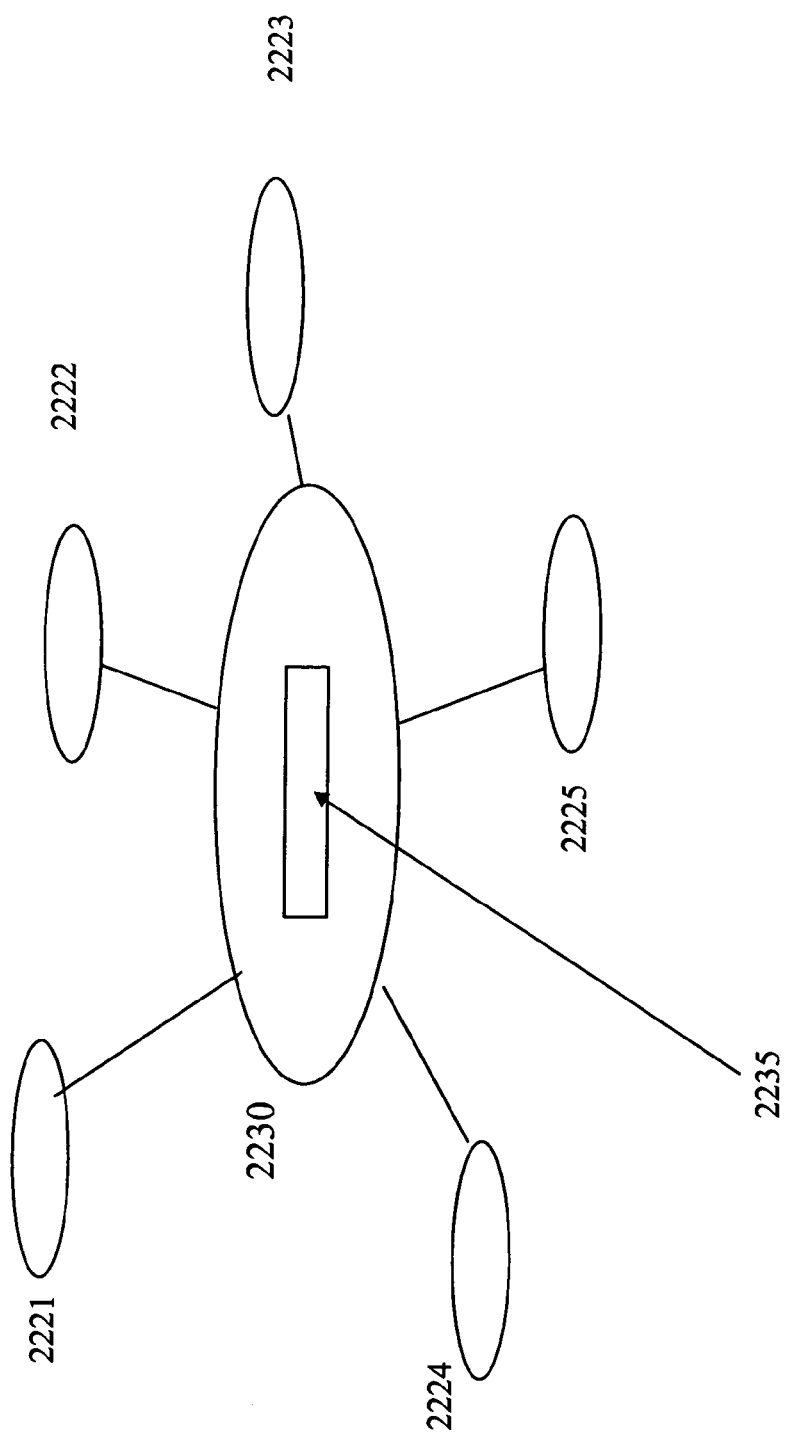

FIG. 12 shows an exemplary relative title position encoding in a change query language script according to a preferred embodiment of the present invention;

FIG. 13 shows an exemplary pseudo-code, for crawling a specific web site page, according to a preferred embodiment of the present invention;

FIG. 14 is a flowchart illustrating attitude data processing according to a preferred embodiment of the present invention;

FIG. 15 shows an exemplary graphic representation of the results of clustering, according to a preferred embodiment of the present invention;

FIG. 16 shows an exemplary graphic representation of the results of correlation measurement according to a preferred embodiment of the present invention;

FIG. 17 shows a first graphic representation of attitude-data analysis according to a preferred embodiment of the present invention;

FIG. 18 shows a second exemplary graphic representation of attitude-data analysis according to a preferred embodiment of the present invention;

FIG. 19 is a flow diagram of an exemplary method for analyzing attitudes expressed in web sites, according to a preferred embodiment of the present invention;

FIG. 20 is a flow diagram of an exemplary method for categorizing attitude-data text according to a preferred embodiment of the present invention;

FIG. 21 is an exemplary pseudo-code algorithm for clustering concepts relating to attitude-data, according to a preferred embodiment of the present invention; and FIG. 22 is a simplified block diagram of an exemplary architecture of an apparatus for analyzing attitudes expressed in web sites, according to a preferred embodiment of the present invention.

DESCRIPTION OF THE PREFERRED EMBODIMENTS

The present embodiments comprise apparatus and method for analyzing public attitudes expressed in web sites or any kind of electronic information found on the web, in a holistic approach.

The embodiments, according to the present invention, are based on collecting information found on the web, generally considered an influential medium, where authentic attitudes are expressed daily. The websites are in effect, today's word of mouth (WOM) as communicated by millions of Internet users.

Millions of web users express their views and feelings in online news groups, discussion groups, forums, chat sites, internet blogs etc. All these new means of communication, intensively used by the public today, have become a major part of the media where people are exposed to ideas, products, and messages and where people express their attitudes.

Embodiments of the present invention aim at collecting the immense amount of high value authentic data pertaining to people's attitudes found in Web sites and holistically analyzing the data, so as to provide with high value attitude information.

The principles and operation of an apparatus and a method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
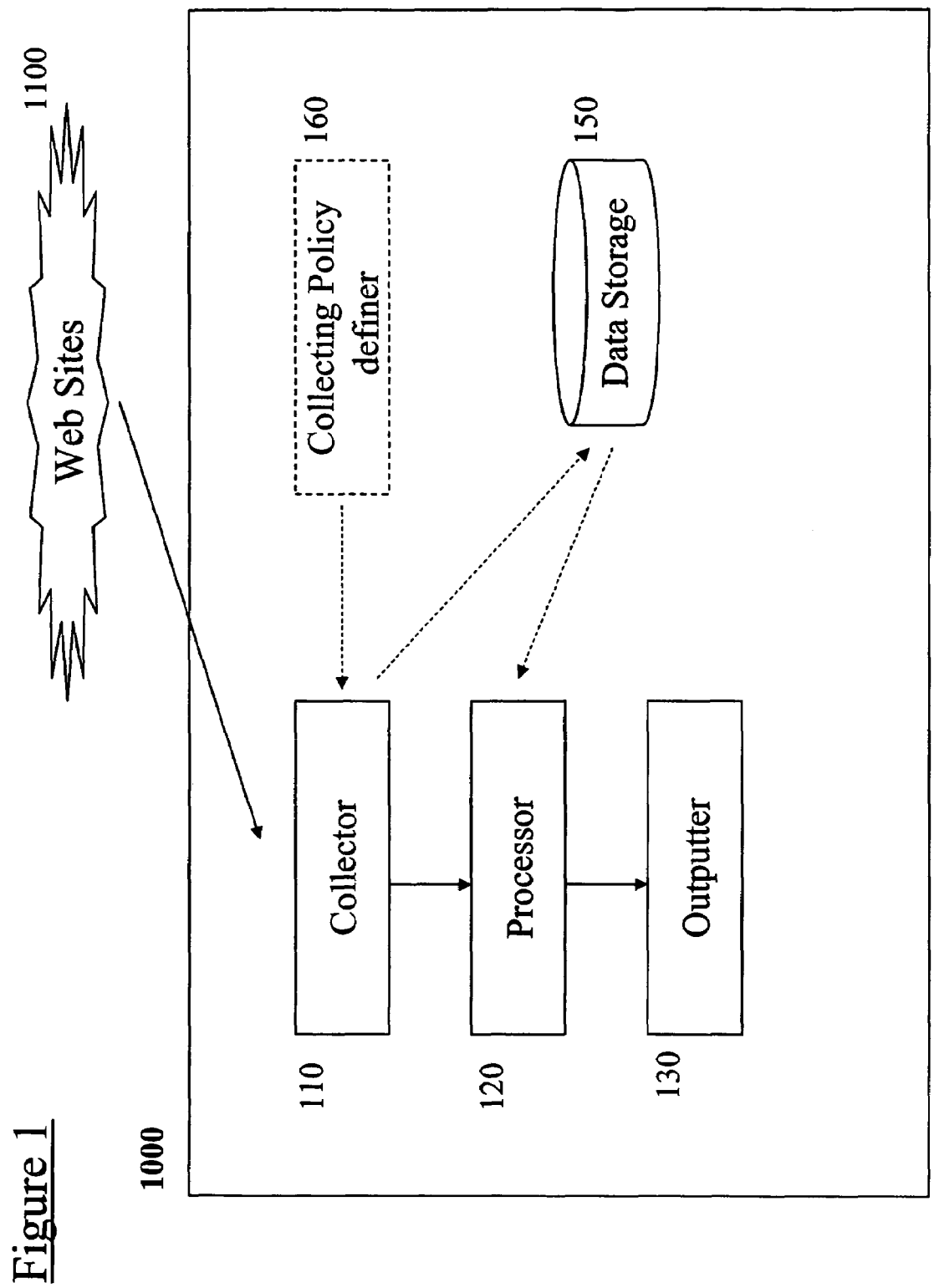

Reference is now made to FIG. 1, which is a block diagram of an apparatus for analyzing attitudes expressed in web sites, according to a preferred embodiment of the present invention.

An apparatus 1000 according to a preferred embodiment of the present invention comprises a collector 110. The collector 110 is configured for collecting data, including but not limited to attitude data, containing attitude expression, from pre-selected web site(s) 1100 the attitude data relating to a pre-defined subject. Preferably, the number of the pre-selected web sites 1100 may reach hundreds of thousands of web sites.

The pre-selected web sites typically include Chat sites, Interactive news groups, Discussion groups, Forums, Blogs and the like where people express their views and feelings. For example: Internet users may express their views regarding a proposed tax reform, to be discussed by a government, regarding a new product etc.

According to a preferred embodiment, the collector 110 is programmed as a crawler in a spider network, arranged to detect new attitude data in the pre-selected web sites. For tracking the new attitude data added to a pre-selected web site, the collector 110 utilizes a script, written in a change detection language, as described in greater detail herein below.

For example, the script may define which parts of a specific page of a pre-selected web site bear a fixed content such as a logo of a firm operating the site, and which parts contain dynamic content, bearing attitude data, such as a continuous flow of user's messages in a web site's chat room.

In another example, the script may define a comparison to be made by the collector 110 between current content of a page or a part of a page and attitude data previously downloaded from the same page or part of the page.

The script may be generated using a collecting policy definer 160, as described in greater detail herein below, and illustrated using FIGS. 9 and 10.

The apparatus 1000, according to a preferred embodiment, further comprises a processor 120, associated with the collector 110, used for processing the attitude-data. The processing of the attitude-data may typically include parsing the attitude-data, content analysis techniques, data mining, and other data analysis techniques. These techniques may implement any one of a variety of algorithms, which includes but is not limited to: neural networks, rule reduction, decision trees, pattern analysis, text and linguistic analysis techniques, or any relevant known in the art algorithm.

The apparatus 1000 according to a preferred embodiment, further comprises an outputter 130, associated with the processor, for outputting resultant attitude information based on the processed attitude-data. Preferably, the output information is presented to a user utilizing a set of graphical tools, as described in greater detail herein below. The graphical tools may be implemented as a stand alone desktop application, as a web browser based application, as a client application in a client-server architecture, etc.

Preferably, the apparatus further comprises a data-storage 150 where the attitude-data is stored.

More preferably the data storage 150 is a data warehouse, provided with a storage area and, preferably, with advanced means for analysis of the attitude-data. In a preferred embodiment, the data warehouse is provided with a set of graphical tools aimed at enabling a user to navigate the processed attitude-data, explore it, and easily find the information the user is interested in.

The graphical tools may be implemented in as a desktop application, a web application, or any other known in the art alternative.

In a preferred embodiment, the collector 110 may continuously monitor the pre-selected web site(s) 1100, on a 24 hours a day and seven days a week basis.

Optionally, a specific schedule for collecting the attitude-data may be set with respect to specific web site(s).

According to a preferred embodiment of the present invention, the collector 110 works in a continuous mode. Preferably, the collector utilizes a change detection language or mechanism, and downloads relevant pages of the pre-selected web site(s), according to a predefined collecting policy.

According to a preferred embodiment of the present invention, the collector 110 further includes a crawler.

The crawler is responsible for crawling the pre-selected web pages for new data, and for downloading relevant web pages there from. Preferably, the crawler is an open system that has capabilities to download all kind of data on the network including, but not limited to: Web pages, Forums, Discussion boards, and Blogs.

Figure 2:
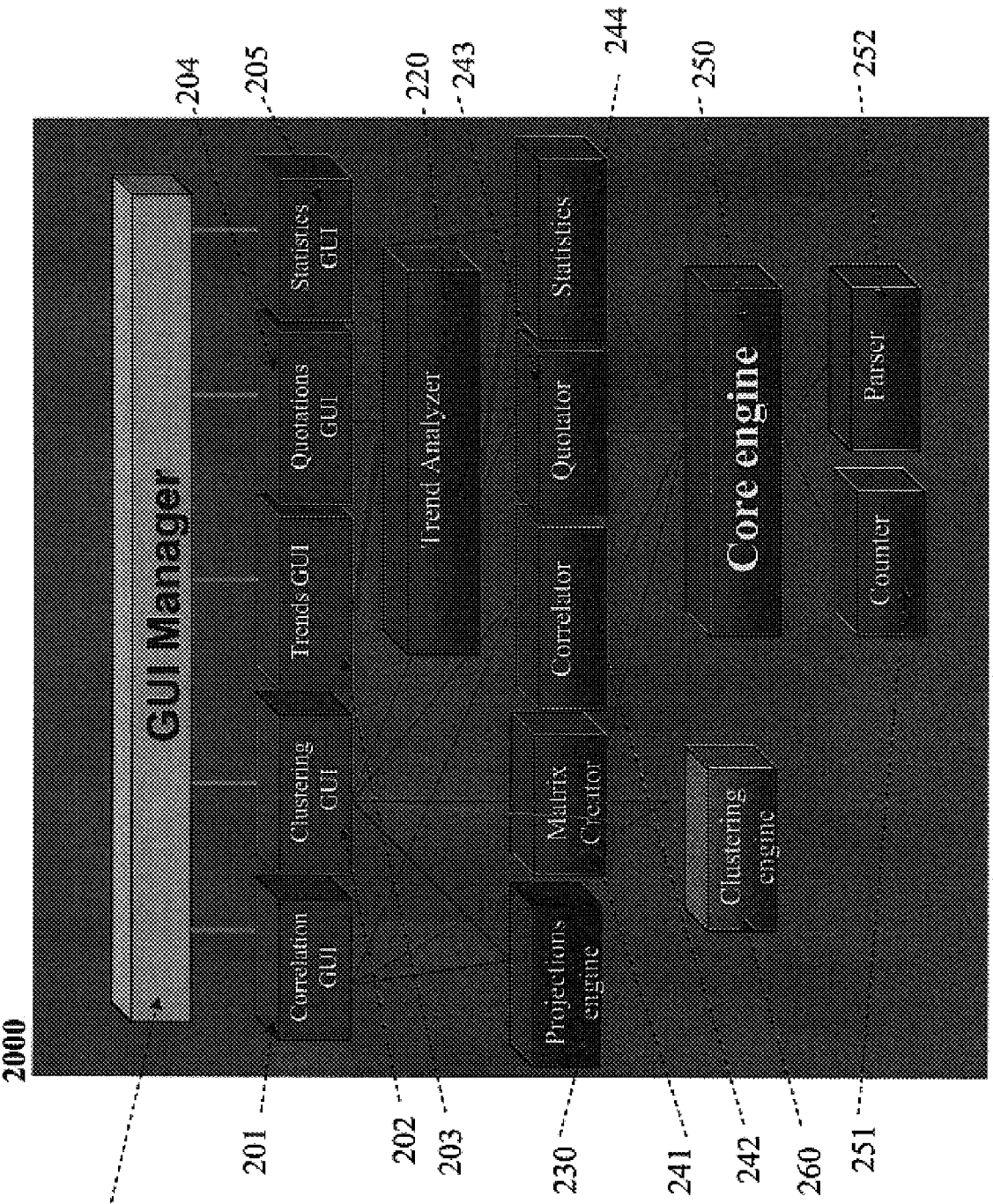

Reference is now made to FIG. 2 which a detailed block diagram of an apparatus for analyzing attitudes expressed in web sites, according to a preferred embodiment of the present invention.

An apparatus 2000, according to a preferred embodiment of the present invention comprises a GUI Manager 210 which manages the interaction with a user of the apparatus 2000.

The GUI Manager 210 includes a Correlation GUI component 201 which is configured to present correlation data pertaining to correlations among phrases having relevance-relationships with a common concept relating to the pre-defined subject, as found in the attitude data, as described in greater derail herein below.

The Correlation GUI component is connected with a correlator 242 which is configured to measure correlation between one or more phrases and a respective common concept relating to the predefined subject, as described in greater detail herein below. The concept may describe an attitude towards the subject such as but not limited to negative, a positive, or a neutral attitude, including any words that do not express a sentiment directly but may be conceptually related in people's minds.

The Correlation GUI is further connected to a Matrix Creator 241 which is configured to a create and populate a N×N Matrix with values indicating distances between correlated phrase, as described in greater detail herein below.

The GUI Manager 210 further includes a Clustering GUI component 202 which presents clusters relating to concepts in the attitude data to the user, as described in greater detail hereinabove. The concept may describe any information regarding the subject, such as: attitude towards the subject such as a negative, a positive, or a neutral attitude, as described hereinabove, or other related concepts, people, products, emotions etc.

Clustering the concepts may be carried out by a clustering engine 260, utilizing clustering methods, as described in greater detail hereinabove.

Preferably, the Correlation GUI 201 component and the Clustering GUI component 202 are further connected with a Projections engine 230 which graphically positions items representing clusters and correlated phrases on the GUI's screens, such as the screen presented in FIG. 15 herein below.

The GUI Manager 210 further includes a Trend GUI component 203 which presents the user with trend data. The trend data is generated by a Trend Analyzer 220 which is configured to detect trends in the attitude data. The trend analyzer is fed by a Statistics component 244 which generates statistical data pertaining to the appearing of attitude expressing phrases in the attitude data, as described in greater detail herein below. For example, trend GUI may facilitate the detection of a shift in public discussion of a specific concept, or expression of specific attitudes.

The GUI Manager 210 may further include a Statistics GUI component, 205 connected to Statistics component 244, for presenting the statistics data generated by the Statistics component 244 to the user.

The GUI Manager 210 further includes a Quotations GUI component 204 which presents the user with quotations relating to the concepts presented to the user by the correlator GUI 201, as described hereinabove. The Quotations GUI component 204 is fed by a Quatator 243 which is configured to extract relevant attitude expressing quotations from the attitude data.

The Statistics component 244, the Quatator 243, the Correlator 242, and the Matrix creator 241 are connected to a core engine 250 which includes a parser 252, for parsing the attitude data that is downloaded from crawled pages and a counter 251 for counting the appearances of concepts etc. in the attitude data, as described in greater detail herein below.

Figure 3:
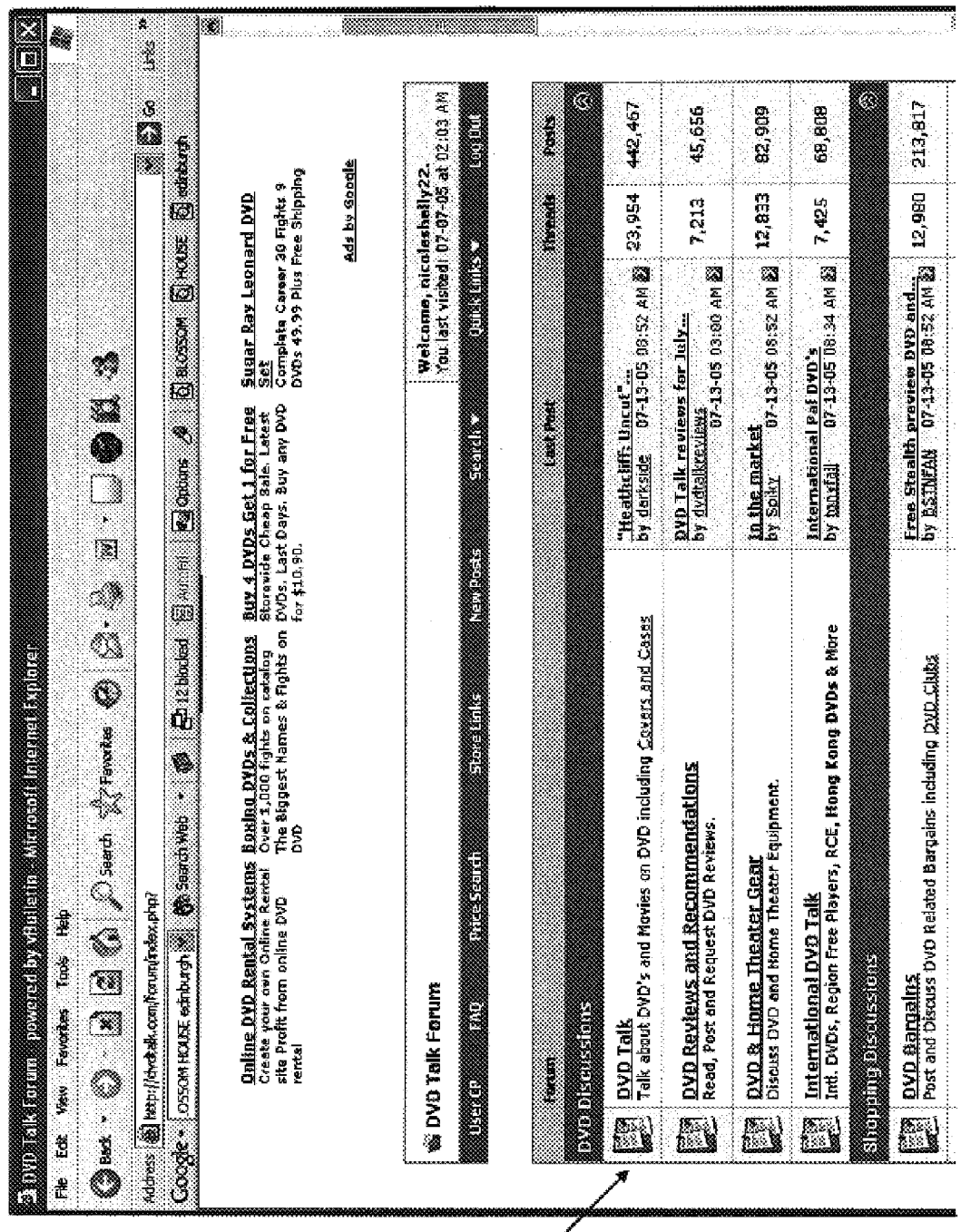

Reference is now made to FIG. 3 which shows an exemplary main forum web page.

The exemplary main forum web page is a DVD Talk forum main web page. In this example, the crawler is preconfigured for crawling the web site, downloading all messages that appear in the threads (topics) of the site forums. In this example, the crawler first crawls the links in the exemplary main forum web page, to all forum header pages 310 available in the pre-selected web site. Preferably, the crawler is further preconfigured to filter out non-relevant links so as to avoid downloading or attempted downloading of irrelevant pages.

Figure 4:
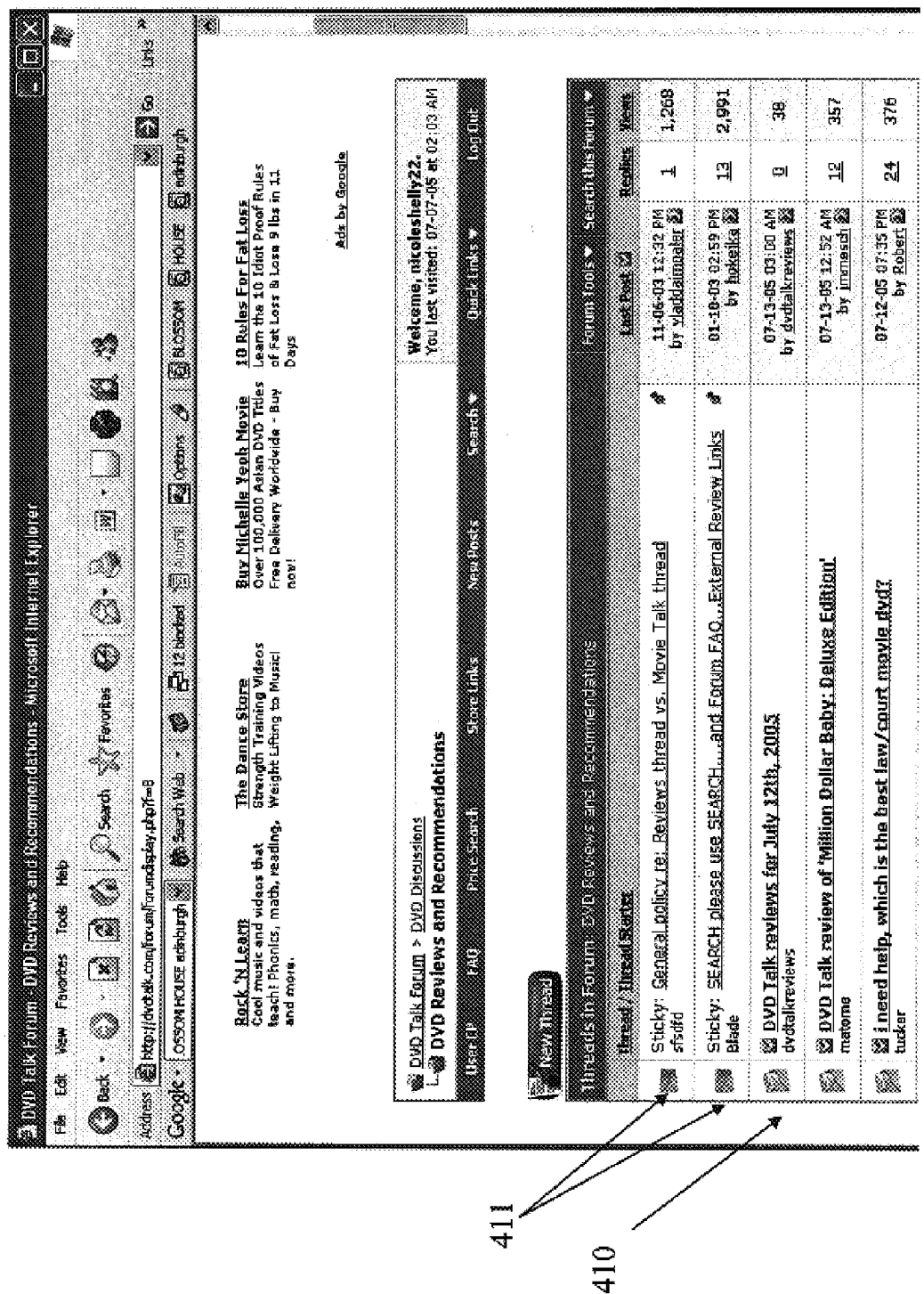

Reference is now made to FIG. 4 which shows an exemplary forum header web page.

After the crawler gets the links to the forum header pages from the exemplary main forum page, the crawler crawls relevant threads 410 appearing in each of the header web pages, according to the links 310. Preferably, the crawler is pre-configured for filtering out non-relevant threads like the general policy and search threads appearing in this example 411.

Figure 5:
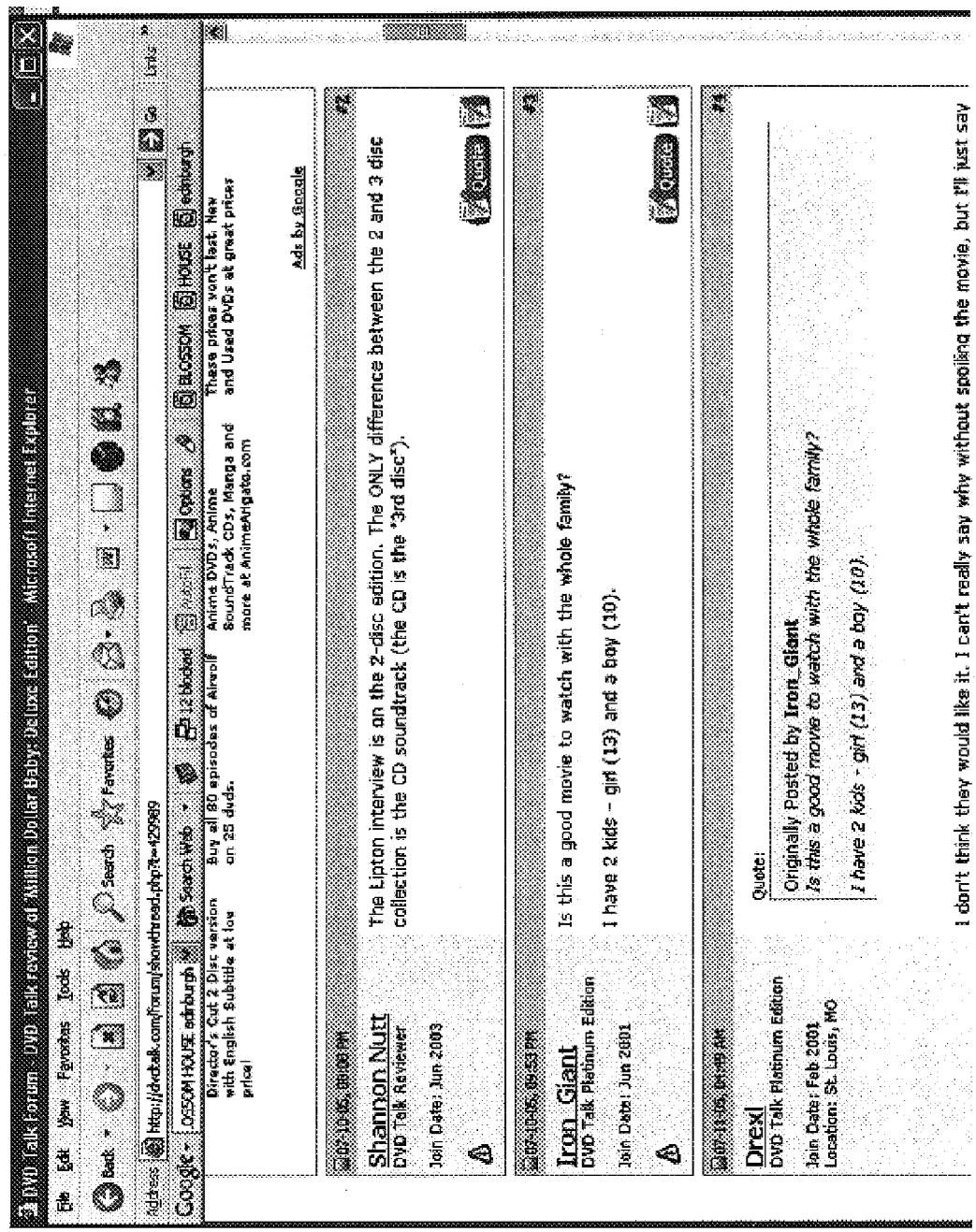

Reference is now made to FIG. 5 which shows an exemplary message header page.

According to a preferred embodiment of the present invention, for each of the relevant threads 410, the crawler extracts relevant attitude-data, which contain attitude expressions. As shown in the example page on FIG. 5, each message optionally comprises a date, a title, an author, and a message body.

Optionally, each message also contains a list of quotes (quotations from other cited messages), and signature. The quotes are marked in the message so that, during his analysis procedure, the user can choose if he wants his analysis to be performed on the messages including the quotes or not. The message signatures (when present) are filtered during the crawling process, in order to avoid skewing the results, as described in greater detail herein below.

The data has to be extracted from the page, while omitting all irrelevant information. It is important to remember that there are many types of irrelevant information that may be found on such message pages. The irrelevant information includes but is not limited to: other messages, signatures, html tags, ads etc. and those vary from one site to another.

Preferably, the collector 110 implements a predefined collecting policy. The collecting policy may include specific guidelines with respect to specific ones of the pre-selected web sites. These guidelines may define which parts of the pre-selected web site(s) to crawl, in what order, etc.

Figure 6:
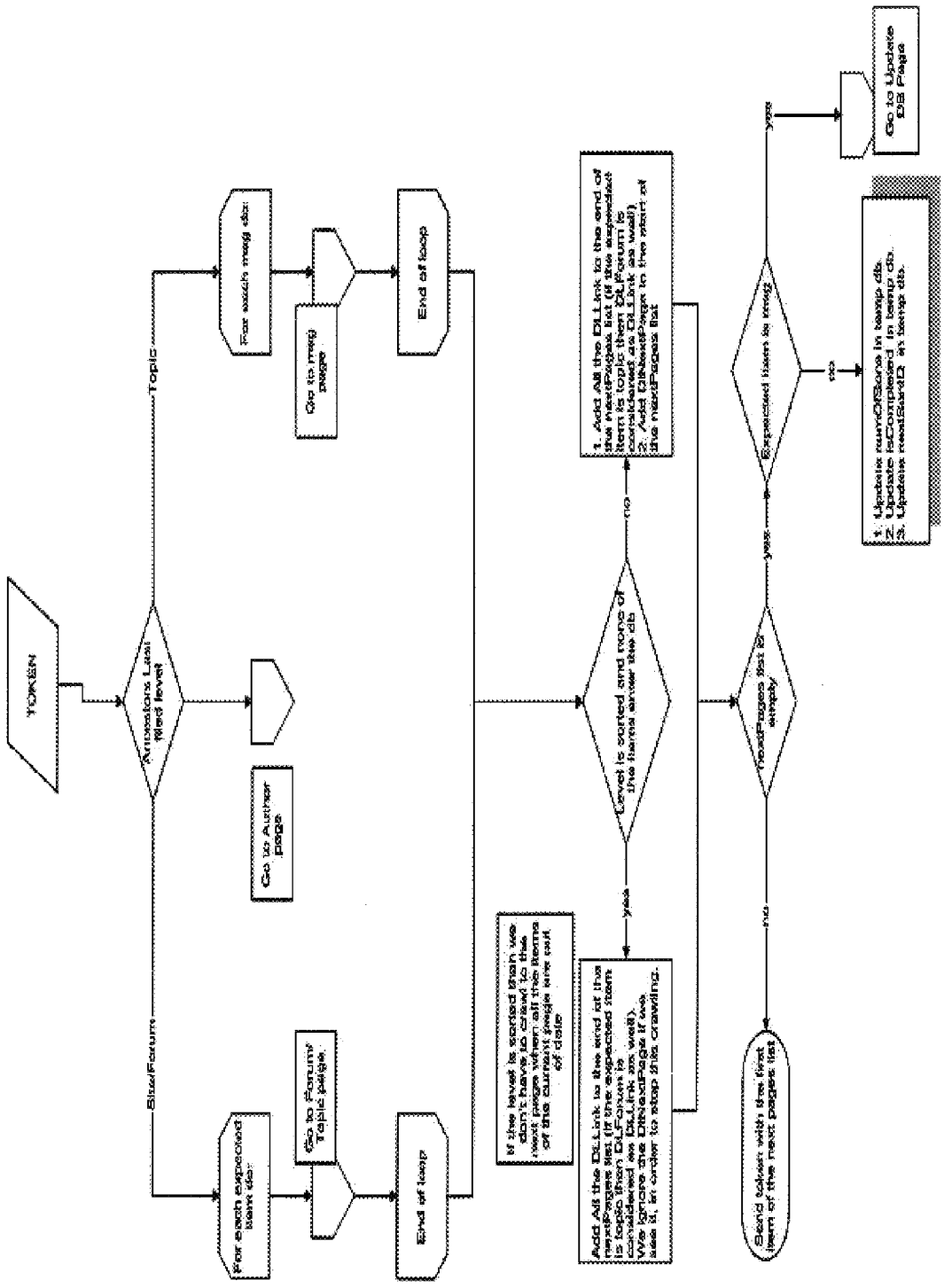

For example, reference is now made to FIG. 6 which is a flow chart illustrating an implementation of a predefined collecting policy for a specific forum web site, according to a preferred embodiment of the present invention.

In a preferred embodiment, the collector 110 uses a HTTP request for downloading the relevant page(s) of the pre-selected web site(s), according to URL addresses.

Preferably, the crawler may be further configured for handling relevant aspects of the crawling such as—session objects, login information, cookies, etc.

According to a preferred embodiment, the crawler is further responsible for scheduling downloading processes of relevant pages of the pre-selected web site(s) (i.e. request per time quantum per site).

In addition, the crawler may be also configured for determining in what order the pages are downloaded. Preferably, network traffic is also carefully monitored by the crawler, with respect to the pre-selected web sites, so as to avoid generating excessive traffic on the web site(s), by carefully scheduling the downloading process.

Optionally, the crawler verifies that a pre-defined time interval is kept between one access to a certain web site and another access, so as to try avoiding creation of network overload on the web site.

According to a preferred embodiment, several crawlers are employed in parallel in the downloading process and each of the crawlers is configured for downloading respective web site(s).

According to a preferred embodiment of the present invention, the collector 110 further includes a parser. Once a relevant page is downloaded by the crawler, it may be forwarded to the parser.

The parser is configured for parsing the relevant page and for extracting relevant attitude data from the relevant page or links top pages that contain this relevant data.

Relevant data sections may be found on the message text, message title, date, author and other places on the page. The parser is further configured for filtering out irrelevant information on the page, like html tags, adds, header, footer etc.

In a preferred embodiment of the present invention, the parser may apply a script, customized specifically by a user for each web site, to extract relevant attitude-data from the web site, while filtering out non-relevant or corrupted data. The non relevant data may include but is not limited to: hidden data such as html tags and scripts that are mainly used for page definition and page control, and non relevant content data like texts that are presented on the web page but are not relevant with respect to the attitude-data, such as a page number, a commercial footer, a banner etc.

In a preferred embodiment of the present invention, after irrelevant data is removed and only the relevant attitude-data remains in the web page, the parser converts the web page into a mark-up language format representation. Optionally, the mark-up language is XML. In the mark-up language format representation, relevant data and metadata may be encoded in a searchable and indexable format.

According to a preferred embodiment, specific types of data, found on the web page, are handled by the parser in a specific manner, in accordance with a predefined policy.

For example, in message boards, very often a user issues a new message, citing a message previously posted by another user. The cited message appears in the new message. However, for analysis purposes it may be ignored, as it may skew the statistics of the results if it is counted twice in spite of the fact it is not a new unique message. In another example, message signatures may also skew the results, as they are identical for all messages a specific user issues. During analysis, the words appearing in the signatures may skew the statistics.

Thus the parser may be configured to recognize and ignore parts of messages such as quotations from other messages or signatures.

Reference is now made to FIG. 7 which shows an exemplary semi-XML format parsed attitude-data bearing page representation, according to a preferred embodiment of the present invention. The provided example illustrates the encoding of page including a community name (DVD Talk in the example) 710, a forum name (DVD Exchange in the example) 720, a message title 730, a date 740, a author 750 and the body of the message 760 are encoded in a searchable and indexable XML language format representation.

In a preferred embodiment of the present invention, the collector 110 further comprises a data integrator (updater).

The data integrator is responsible for verifying that only relevant pagesdocuments crawled from the internet are stored in the data storage 150. The data integrator checks that a current document does not already exist in the data storage 150. The data integrator is also responsible for checking the completeness of the download, i.e that no errors are found, the parsing is carried out successfully, etc.

When the Updater identifies that all pages are downloaded (For example, according to the expected number of pages that should be downloaded), it crawls all the user profiles, and then folds the whole downloaded data set to the data storage 150 or calls another component, say a utility of a data base management system (DBMS), for folding the data to the data storage 150.

The data integrator may be configured for integrating the attitude data into a complete and non-redundant attitude data. The integration of attitude data by the data integrator may include but is not limited to: handling redundancy of data, preventing keeping duplicate page etc. Integrating the data may further include ensuring complete download of all relevant data bearing pages of the web site(s), i.e.—that the attitude-data is error free, that the parsing is successfully completed etc. The data integrator may be further configured for indicating when and if all relevant pages are downloaded.

In a preferred embodiment, the data integrator is further configured for deciding if an apparent error, detected when downloading a web page, is recoverable or should the web page be regarded as corrupted and be accordingly ignored.

The data integrator may be further configured for updating the data storage 150 with the attitude-data, while carrying out the integration of the attitude-data as described hereinabove.

According to a preferred embodiment of the present invention, the apparatus 1000 further comprises a collecting policy definer 160 which is associated with the collector 110 and is used for defining the collecting policy.

Preferably, the collecting policy may address various aspects of the collecting process. The collecting policy may define which web site(s) or what kind of web sites the collector collects attitude-data from. The collecting policy may provide specific guidelines for crawling through a specific web site. The specific guidelines may define which kinds of data that are found on pages of the web site are to be ignored, in what order should the web site be crawled, how the pages are parsed, how different types of data are marked up, etc.

Figure 8:
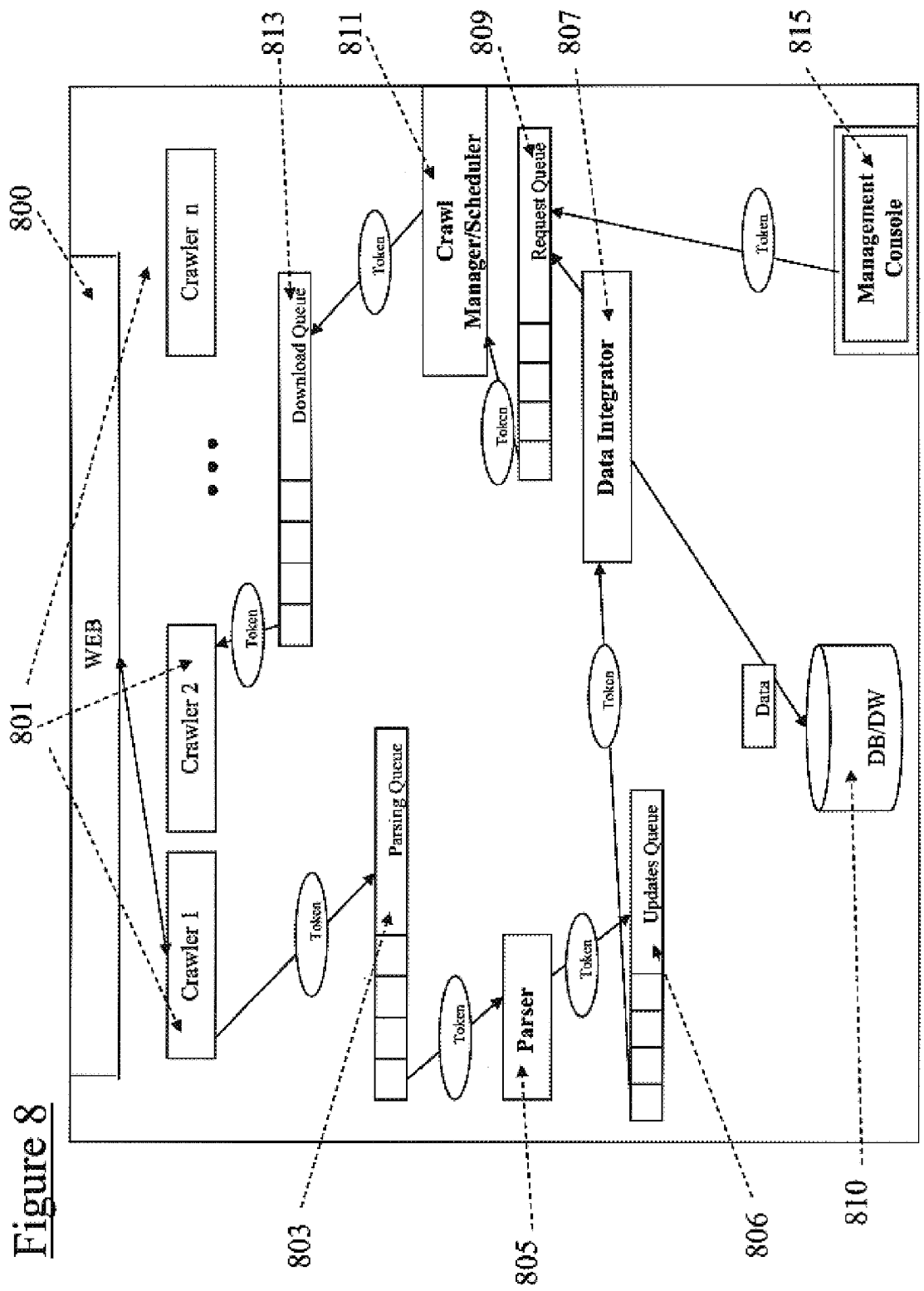

Reference is now made to FIG. 8 which is a block diagram illustrating an apparatus for collecting attitude-data from web site(s) according to a preferred embodiment of the present invention.

An apparatus according to a preferred embodiment of the present invention comprises one or more crawler(s) 801. Each crawler may be assigned to respective pre-selected web site(s) 800 for crawling, to locate and download relevant web pages carrying attitude-data therefrom.

Each of the downloaded web pages is then put in a parsing queue 803 where from, in its turn, the page is parsed by a parser 805. Preferably, the parser 805 is configured to parse a web page and create a mark-up language base representation of the web page. Preferably, the mark-up language is XML. The parser may be further configured for forwarding the parsed page(s) to an update queue 806.

An apparatus according to a preferred embodiment also includes a data integrator (updater) 807. Preferably, the data integrator 807 is configured for fetching the parsed pages data from the updates queue 806, integrating the data by handling redundancy of data, preventing from keeping duplicate pages etc. Integrating the data may further include ensuring complete download of all relevant data bearing pages of the web site(s)—such as next pages, navigation from forum to topic and then to the message itself etc.—utilizing a request queue 809, ensuring that the attitude-data is error free, verifying that the parsing is successfully completed etc. Finally, the data integrator updates a database (DB) or a data warehouse (DW) 810 with the parsed pages carrying the attitude-data.

A preferred embodiment of the present invention may further include a crawl manager/scheduler 811 which manages the crawler(s) 801 and schedules the crawling of pre-selected web page(s) according to the request queue 809, utilizing a downloads queue 813 to be used by the crawler(s) 801. Preferably, the request queue is managed by a collecting policy definer 160, preferably implemented as a management console 815.

This crawl manager/scheduler 811 is responsible for scheduling the download process (i.e. request per time quantum per site), in addition it is responsible for the order of pages being downloaded.

Network traffic is carefully monitored by the various web sites, and trying to avoid generating over traffic on the downloaded web sites, a carefully schedule may be implemented for the download process. The Crawl Manager 811 is responsible for the scheduling and verifies that a pre-defined time interval is kept between one access to a certain web site and the other, in that way the generation of network overload on the crawled web sites by the crawling may be avoided.

In addition, employing several crawlers 801 together allows parallelism in the downloading process, downloading many web sites in parallel while accessing each one only once in a while.

Also, as the ratio of new user post pages (documents) to exiting pages is not very high, an updated list of the new post pages may be maintained and used for further reducing crawling activities on the crawled web sites.

Figure 9:
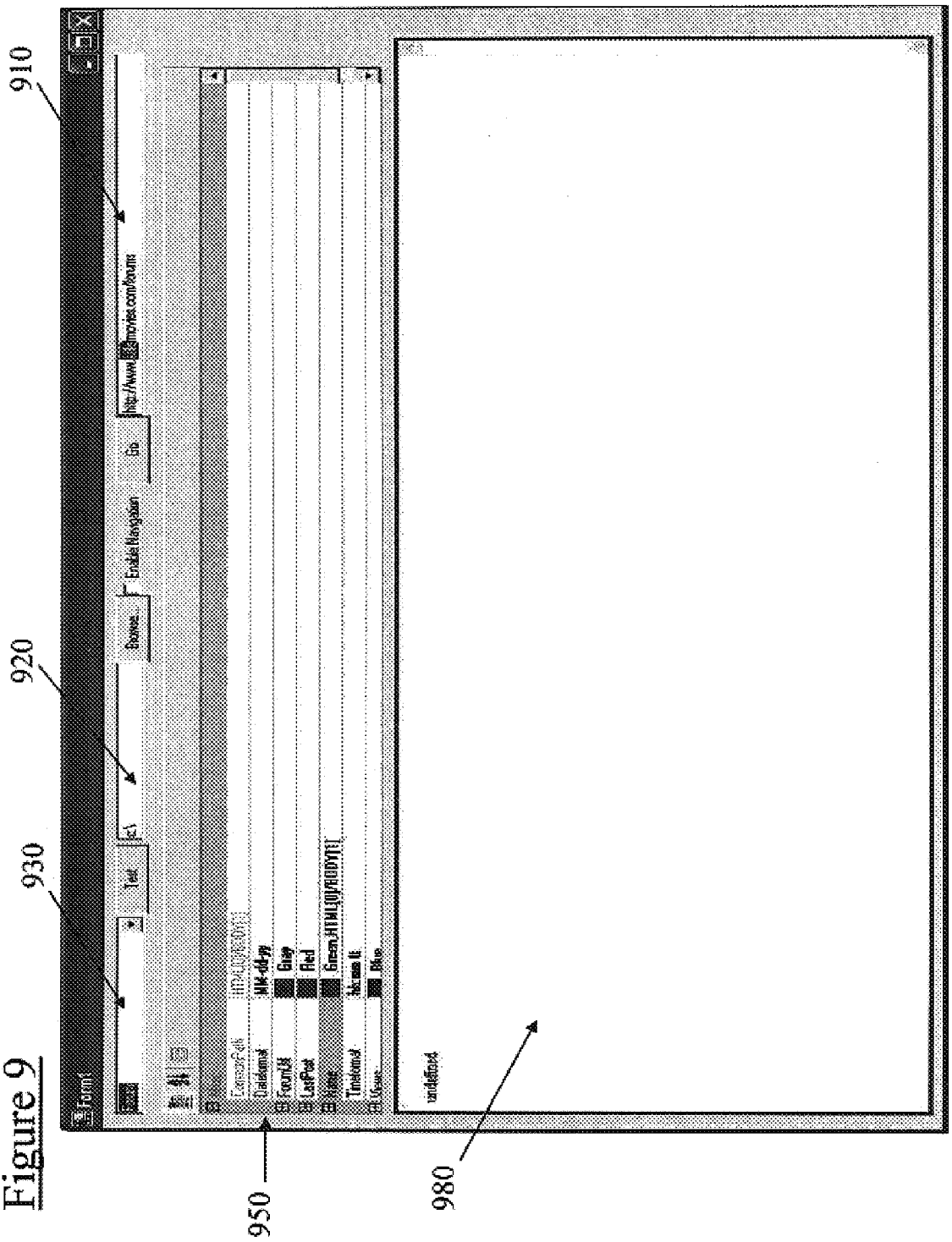

Reference is now made to FIG. 9 which shows an exemplary collecting policy definer graphical user interface (GUI), according to a preferred embodiment of the present invention.

According to a preferred embodiment of the present invention, the collecting policy definer 160 includes a graphical user interface (GUI), which graphically facilitates the definition of a collecting policy by a user of the apparatus 1000.

In the exemplary collecting policy GUI of FIG. 9, on the top of the screen there is a settings bar where the user inputs the address of the web site page 910 for collecting attitude-data there from, the output file 920 to save the results in, and the page type 930.

Below the setting bar there is a window 950 where the user may provide other definitions. For example: The color coding for each of the marked fields, the date format being used in this particular site (e.g. European, American, or other) and optionally other relevant definitions.

Below the window 950 is the main working area of the application 980. The main working area 980 has the behavior of a browser and loads a web site page so as to allow the user to define the specific collecting policy with regards to the specific web site page.

When the page is loaded the user may mark the relevant parts on the page, indicating what section reflects what part of information to be crawled, or optionally, to be ignored. This operation is preferably repeated for each part of a web site (i.e.: forums list, topic list, message pages, author profiles, etc.).

According to a preferred embodiment of the present invention, the collecting policy definer 160 is configured to use the definitions made using the GUI, as described hereinabove, for generating a script encoded collecting policy. The collecting policy may specifically define how each element on the page is crawled or parsed.

Figure 10:
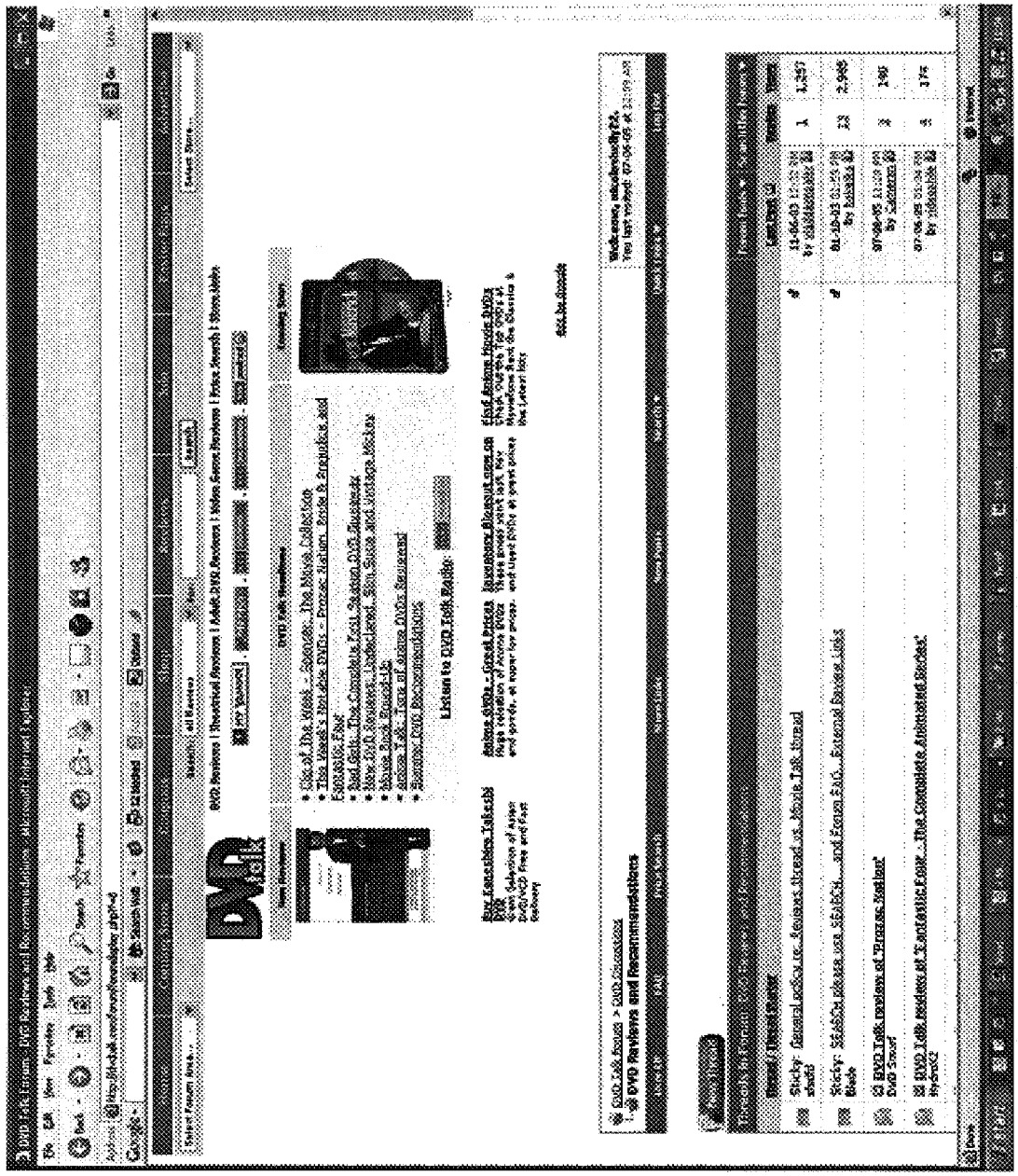

Reference is now made to FIG. 10 which shows an exemplary Web site page.

The exemplary page (http://dvdtalk.com/forum/forumdisplay.php?f=8) is a Forum web site page. The exemplary page has several main parts: a header, headlines, banners, a quick launch area for starting frequently used forums, and a list of forums.

Using the GUI of the collecting policy definer 160 the user may graphically select part(s) of the web site page and define a collecting policy for the part(s) as well as for the whole page.

Figure 11:
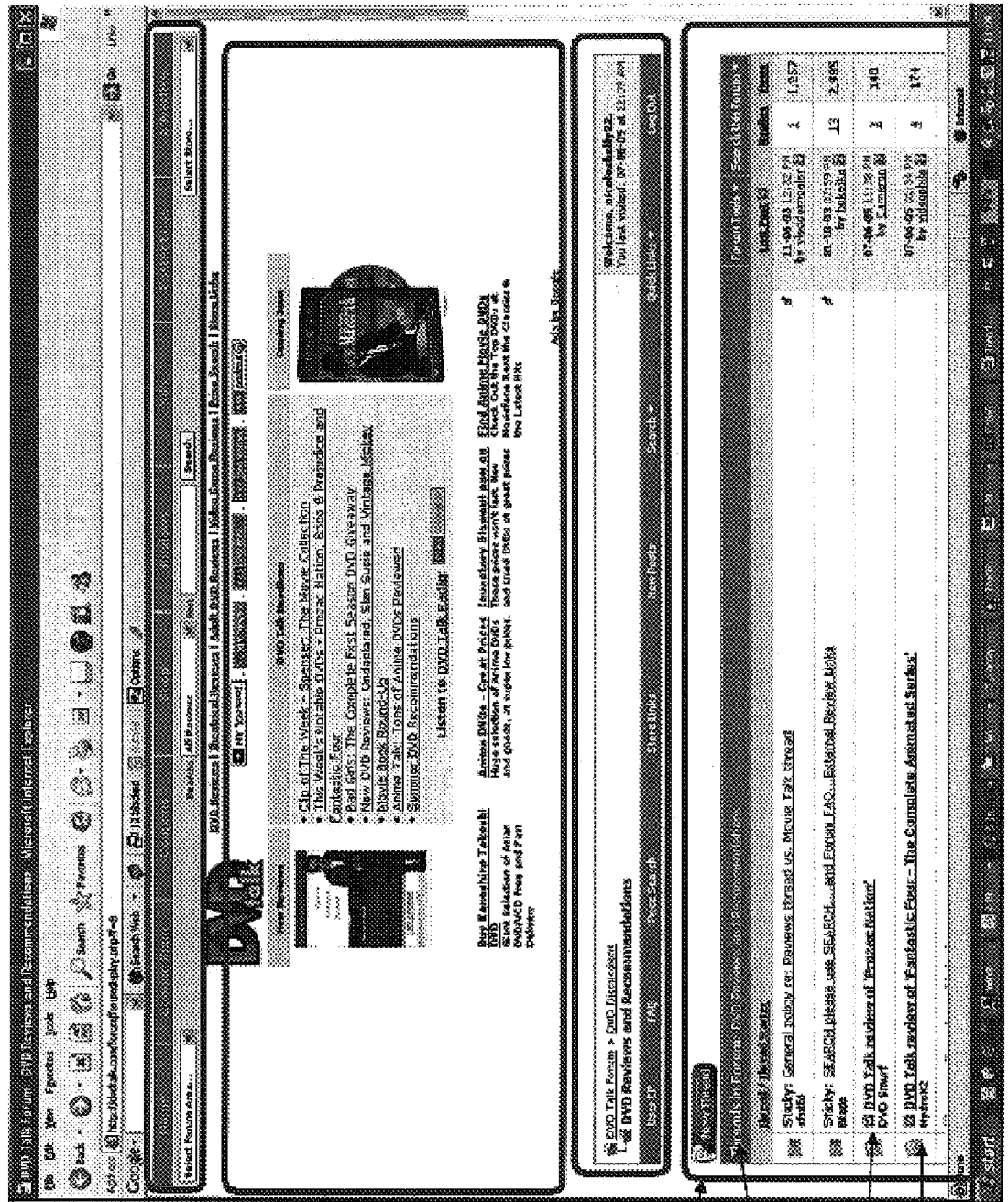

Reference is now made to FIG. 11 which shows an exemplary user marked web site page, according to a preferred embodiment of the present invention.

The web site page of FIG. 10 is now presented having its main parts graphically selected and marks by the user.

With regards to the exemplary page, the user may define that only the elements of the list of forums 1110 are to be crawled and parsed.

According to a preferred embodiment, each element is regarded by the collecting policy definer 160 as having a position relative to a parent element.

In the example of FIG. 11, each element 1111-1112 of the list of forums 1110 has a relative position with respect to the header of the list 1120. Consequently, when the absolute position of the header is changed, say when a new advertisement banner is positioned by an operator of the web site, just above the list of forums, the relative position of each element on the list remains the same.

Reference is now made to FIG. 12 which shows an exemplary relative title position encoding in a change query language script according to a preferred embodiment of the present invention.

The provided exemplary position is relative to a header of an html table. The table header has fixed position on the page, and the shown exemplary relative title position is encoded in relation to the fixed position. The parser 805 uses the definition provided by the user as illustrated in FIG. 10-11 and explained herein above, to correctly encode a generic title position relative to the fixed position of the table header.

Reference is now made to FIG. 13 which shows an exemplary pseudo-code, for finding the specific element definition in the collecting policy GUI (FIG. 9) on a specific web site page, according to a preferred embodiment of the present invention.

The provided exemplary pseudo-code describes a sequence of steps for collecting policy GUI (FIG. 9) to extract from the exemplary web site page that may be a part of the collecting policy, encoded in a script, based on user provided definitions, as illustrated and explained using FIGS. 10-11 hereinabove.

According to a preferred embodiment of the present invention, the collector 110 is configured for carrying out several steps of processing with regards to the collected attitude-data.

Reference is now made to FIG. 14 which is a flowchart illustrating attitude data processing according to a preferred embodiment of the present invention.

According to a preferred embodiment of the present invention, the attitude data is processed in a pipeline mode, wherein each document/message in the crawled web pages undergoes a series of steps that are applied to it in a row.

According to a preferred embodiment, Internet sites 1400 are crawled for new messages, bearing attitude-data, based on a script in a change query language as described herein above.

Preferably, any given web page may be downloaded using HTTP protocol. However, the page has to be parsed in order to extract its information. This is already the role of the above described parser.

The parser may represent the downloaded web page as a XML tree, and apply a change query language script, specifically customized for each web site, to extract the relevant information from it, skipping all the non-relevant info.

For example, the change query language may be an Extensible Style sheet Language Transformation XSLT language, which is a language for transforming XML documents into other XML documents.

The XSLT script may have the ability to ignore all kind of non relevant data, based on an ad-hoc customization, as described in greater detail herein below, for the collecting policy definer.

The relevant pages are downloaded and parsed 1401 to identify their relevant text section and the metadata relating to the new attitude-data such as: title, author, or date, is extracted from the collected attitude-data.

The processor 120 may further include a runtime environment which may be further configured for labeling each message/document with relevant metadata.

Then, the processor 120, using an on-line interface, categorizes 1410 relevant texts of the collected attitude-date using supervised approaches.

Next, the processor 120 carries out classical text categorization by content, which involves assigning each message/document a list of topics being discussed in it, based on the identification and analysis of issues discussed in the collected attitude data. In addition, processor 120 carries out text categorization by sentiment, which involves assigning each message/document its polarity label (positive, negative or neutral).

According to a preferred embodiment of the present invention, the content based categorization of the collected attitude-data may be based on an output generated by a training/testing environment which may be a part of the processor 120, and may be used to form the model for categorizing the attitude expression, i.e. the logic of how to identify titles, topics, age groups, gender etc, as described in greater detail herein above.

Optionally, the processor 120 may utilize one of the text categorization techniques in a range which includes but is not limited to: Feature Selection, Feature filtering, and Training as described in greater detail herein below.

In a preferred embodiment, the processor 120 is also configured to carry out text categorization by style technologies. Such technologies may add and categorize vital data about the document author, like his age or his/her gender, without having any direct background knowledge about the author.

Categorization by style technologies are based on the idea of analyzing the writing style, the language used by the author, the use of foreign language words etc. to indirectly learn about the author. Learning about the author, the attitude data may be categorized according an age group, gender, etc.

Style text categorization may enrich the queries and analysis the end user can perform on the data. Since this style derived information is static, it may be generated in a meta-data pre-processing stage as well.

According to a preferred embodiment of the present invention the processor 120 may include a Statistics Generator for generating various statistics relating to the collected attitude-data.

Preferably, the processor 120 includes data mining tools for mining 1412 the collected and processed attitude-data, so as to provide a user with means for carrying out pattern analysis and trend detection 1430 in the attitude data.

According to a preferred embodiment of the present invention, the processor may implement any of the methods described hereinbelow for categorizing the texts of the attitude-data and for further analyzing the attitude-data, say for providing statistics relating to the attitude-data or for mining the attitude-data.

The results of the categorization and data mining steps are output and stored in a data storage (a database or a data warehouse) 1420.

Preferably, the processor 120 may further include a concept analyzer, operable by an analyst/user 1450 for concept analyzing 1431 the attitude data, for finding in the attitude-data relevance-relationship(s) between a phrase, comprising one or several words, and a respective concept, as described in greater detail hereinbelow.

More preferably the processor 120 may also include a correlation measurer, configured for measuring 1432, in the attitude-data, correlations among phrases having relevance-relationships with a common concept, and for measuring correlation between one or more of these phrases and the common concept, as described in greater detail herein below.

According to a preferred embodiment of the present invention, the processor 120 may further include a quotation extractor, for extracting 1433 from the attitude-data key quotations which are found to be descriptive of a relevance-relationship existing in the attitude-data between a concept and respective phrases (comprising one or more words), as described in grater detail herein below.

According to a preferred embodiment, the processor may further include a clusterer. The clusterer may be operable by a user/analyst 1450 for clustering concepts 1434 relating to the attitude-data, as described in greater detail herein below.

According to a preferred embodiment of the present invention, the outputter 130 provides a user 1440 or an analyst 1450 with various graphical tools for examining, exploring, and analyzing attitude-information, generated by collecting and processing the attitude-data. Optionally, the graphical tools may be provided as a web application 1442, so as to allow the user to examine and explore the attitude data remotely via the web.

Reference is now made to FIG. 15 which shows an exemplary graphic representation of the results of clustering concepts in the attitude data, according to a preferred embodiment of the present invention, as described hereinabove.

With clustering, individual messages are analyzed for a central attitude and then added a corresponding cluster of attitudes.

In the central part of the screen the user can see the generated clusters as circles 1501, clusters with more messages/documents are denoted as bigger circles, their distance is displayed by their visual layout. Clusters that are in the red-region 1503 are clusters of negative attitude, while positive attitude ones are in the green part 1505.

On the left screen side, the user can see the topic of each cluster 1507. Clicking on one of the clusters displays to the user a set of relevant message/document citations for each of the clusters.

Reference is now made to FIG. 16 which shows an exemplary graphic representation of the results of correlation measurement according to a preferred embodiment of the present invention.

The correlation measurer, discussed hereinabove, measures correlations of relevant phrases for a central concept as well their cross-relationships. An exemplary visualization of results of the measurement is shown in FIG. 16.

In the center is the main concept ("USA") 1601 surrounded by words indicating anti-American attitude expression in the web. The colors describe the various phrase types that are related to the central term, and their cross relations, according to a provided legend 1605. Optionally, the layout algorithm may be based on a SVD (factor analysis) formula combined with MDS (multi dimensional scaling), wherein an n×n matrix is used to measure the distances between each pair among the relevant phrases, n denoting the number of phrases.

Reference is now made to FIG. 17 which shows a first exemplary graphic representation of attitude-data analysis according to a preferred embodiment of the present invention.

According to a preferred embodiment the outputter 130 includes a user friendly graphical front end environment for defining and viewing attitude-information. Preferably, there are two types of front end: a desktop application and a web based client.

For example, the front end environment may provide a user with means for tracking trends, buzz, and sentiment, which are preferably based on the data warehouse 150 capabilities such a multidimensional data analysis.

Users may analyze their company's\product's word of mouth over time according to the different markets and vertical markets. Such analysis may prove very beneficial for the users.

In addition the user has the ability to compare his company\product to other products or companies in his vertical market or to a benchmark, set according to an industry standard. For example, as illustrated in FIG. 17, the user may investigate the concept of the top ten movies 1701, as depict in a chart showing the trend among the ten most popular in a monthly basis 1703.

Reference is now made to FIG. 18 which shows a second exemplary graphic representation of attitude-data analysis according to a preferred embodiment of the present invention.

Preferably, more advanced capabilities then the ones presented in FIG. 17 are available for the advanced user. For example, as shown in FIG. 18—analysis according to gender

1801, analysis according to age range 1803, selection of chart types 1805, selection of axis data 1807, etc. are further available more advanced capabilities.

For example, when the user chooses to analyze the sentiment with regards to his product according to gender 1801, with respect to all age groups (combined) 1803, he may be presented a bar chart 1810 depicting the positive vs. negative vs. natural attitudes towards his produce.

Reference is now made to FIG. 19 which is a flow diagram of an exemplary method for analyzing attitudes expressed in web sites, according to a preferred embodiment of the present invention.

According to a preferred embodiment, attitude data 1900 relating to a subject which is predetermined by a user, say using the apparatus 1000, is collected 1901 from pre-selected web site(s), say by a collector 110, as described hereinabove.

The pre-selected web sites may include, but are not limited to: Chat sites, Interactive news groups, Discussion groups, Forums, blogs and the like where people express their views and feelings. For example: Internet uses may express their views regarding a proposed tax reform, to be discussed by a government, regarding a new product etc.

Optionally, the collecting may include any number of web sites.

Next, the collected attitude-data is processed 1903, say by a processor as described hereinabove.

The processing 1903 of the attitude-data may typically include content analysis techniques, data mining, and other data analysis techniques. These techniques may implement any one a variety of algorithms, which includes but is not limited to: neuronal networks, rule reduction, decision trees, pattern analysis, text and linguistic analysis techniques, or any relevant known in the art algorithm. Detailed exemplary algorithms, usable for processing of the attitude-data are provided herein below.

Finally, the processed attitude-data is used for outputting 1905 attitude-information to a user, say by an outputter 130, as described hereinabove.

The outputting 1905 may be carried out utilizing graphical tools for presenting and analyzing attitude-information, as described in greater detail hereinabove.

According to a preferred embodiment of the present invention, the collecting 1901 may include crawling the web sites according to a predefined policy. Preferably, the collecting further includes parsing relevant downloaded pages of the pre-selected web sites, as described in greater detail hereinabove.

Preferably, the crawling is carried out according to a policy defined by a user, say by a collecting policy definer 160, as described hereinabove.

According to a preferred embodiment the processing 1903 is carried out in an initial pre-processing step, where metadata relating to the collected attitude-data is processed in advance.

According to a preferred embodiment, the processing 1903 includes categorizing relevant text of the collected attitude-date using supervised approaches.

Preferably, in addition to classical text categorization by content, which involves assigning each message/document a list of topics being discussed in it, a preferred embodiment may include using text categorization by style technologies. Such technologies may add and categorize vital data about the document author, like his age or his/her gender, without having any direct background knowledge about the author.

As described herein above, categorization by style technologies are based on the idea of analyzing the writing style, the language used by the author, the use of foreign language words etc. to indirectly learn about the author.

Style text categorization may enrich the queries and analysis the end user can perform on the data. Since this style derived information is static, it can be generated in a metadata pre-processing stage.

Reference is now made to FIG. 20 which is a flow diagram of an exemplary method for categorizing attitude-data text according to a preferred embodiment of the present invention.

The general flow of the exemplary categorization process includes: data manipulation 2001, and then feature selection 2003 and feature reduction 2005, applied, as described in greater detail hereinabove, for yielding a feature set/cluster 2010. The example further includes train\test 2015 procedures for forming a model which best represents the attitude-information in the collected attitude-data.

Data Manipulation

Texts cannot be directly interpreted by a classification system. Because of this, an indexing procedure that maps a text into a compact representation of its content is preferably uniformly applied to training, validation, and testing of messages/documents, for successfully carrying out the categorization and mining of the attitude data.

The choice of a representation for text depends on what one regards as the meaningful units of text (the problem of lexical semantics) and the meaningful natural language rules for the combination of these units. Similarly to what happens in IR (Information Retrieval), in TC (Text Categorization) a text may be represented as a vector of pairs of terms and their weights. Each of the document terms (sometimes called features) occur at least once (in at least one message/document). There are different ways to understand what a term is and different ways to compute term weights.

A typical way for understanding a term is to identify the term using a word. The way is often referred to as either the set of words or the bag of words approach to document representation, because a bag or set of words is available from which to select the meaning of the term. With the bag of word approach, a list of words and word combinations is weighted according to the number of appearances of each word or word combination in the document. Predefined stop words/combinations are then excluded from the list, and the term is understood in light of the weights of the remaining words/combinations.

Feature Selection

Feature selection may relate to various types of features ranging from textual ones, like words, dictionary based words and also some more grammatical features like part-of-speech tags and their combination. Preferably, Feature selection further includes combinations of phrases, represented as N-grams. N-grams are phrases combining a number (n) of words.

Feature Filtering

Unlike in text retrieval, in TC the high dimensionality of the term space may be problematic, as the objective of TC is to extract an attitude from a mass of words rather than to search for a given phrase. In fact, while typical algorithms used in text retrieval can scale up to high values of terms, the same does not hold of many sophisticated learning algorithms used for TC which is about extracting the general attitude rather then its detailed expression.

Preferably, because of this problem, a Feature filter is also implemented. The effect of the filtering is to reduce the size of the term space. The filtering may apply methods for feature reduction that include but are not limited to: dictionary based reduction, term frequency reduction, and information-gain filtering.

With dictionary based reduction, a limitation is made to a certain group of words that appears in a predefined dictionary words list (like function words).

Term frequency reduction is based on filtering out features that appear in too many messages/documents, such as "I" and "The", or in too few messages/documents. That is to say, terms that appear in too many messages are regarded as too general whereas terms that appear in too few messages are regarded as too specific. Information gain filtering measures the decrease in entropy as a result of the presence of a certain term in the text. This is useful to identify the features that are best distinguishing between groups in the space of documents/messages.

For example, entropy may be formally defined as:

$$IG(t) = \sum_{1}^{m} P(C_i) \log P(C_i) + P(t) \cdot \left[ \sum_{1}^{m} P(C_i \mid t) \log P(C_i \mid t) \right] + P(\bar{t}) \cdot \left[ \sum_{1}^{m} P(C_i \mid \bar{t}) \log P(C_i \mid \bar{t}) \right]$$

Where:
C denotes a category.

$$P(C_i) = \frac{\# docs \text{ in category } C}{\# docs \text{ in all categories}}$$

$$P(t) = \frac{\# docs \text{ where } t \text{ appears}}{\# all \; docs}$$

$$P(C_i \mid t) = \frac{\# docs \text{ where } t \text{ appears in } C_i}{\# all \; docs \text{ where } t \text{ appears}}$$

$$P(\bar{t}) = 1 - P(t)$$

$$P(C_i \mid \bar{t}) = \frac{\# docs \text{ where } t \text{ does not appears in } C_i}{\# all \; docs \text{ where } t \text{ does not appear}}$$

Train\Test Procedure

Preferably, one or more machine learning algorithms is applied on the data set to find a model which best extracts attitude data from the messages/document downloaded from the crawled web sites.

For example, given a collection of messages/documents discussing "sports" and "non-sports", the model learns how to distinguish sport messages/documents from non-sport ones.

In order to do this several models of text categorization may be applied in including but not limited to: Decision Tree (J48), Naïve Bayes, and SVM.

Decision Tree—a decision tree (DT) for text categorization is a tree in which internal nodes are labeled by terms, branches departing from them are labeled by the weight that the term has in the test document, and leafs are labeled by categories.

Such a tree categorizes a test document by recursively testing the weights that the terms labeling the internal nodes have in a vector, until a leaf node is reached. The label of this node is then assigned to the document. Most such trees use binary document representations, and are thus binary trees.

There are a number of standard packages for DT learning, and most DT approaches to TC have made use of such packages. Among the most popular ones are ID3 (used by Fuhr et al. [1991]), C4.5 (used by Cohen and Hirsh [1998], Cohen and Singer [1999], Joachims [1998], and Lewis and Catlett [1994]), and C5 (used by Li and Jain [1998]).

Naïve Bayes—Let X be the data record (case) whose class label is unknown. Let H be some hypothesis, such as "data record X belongs to a specified class C." For classification, we want to determine P (H|X)—the probability that the hypothesis H holds, given the observed data record X.

P (H|X) is the posterior probability of H conditioned on X. For example, the probability that a fruit is an apple, given the condition that it is red and round. In contrast, P(H) is the prior probability, or a priori probability, of H.

In this example P(H) is the probability that any given data record is an apple, regardless of how the data record looks. The posterior probability, P (H|X), is based on more information (such as background knowledge) than the prior probability, P(H), which is independent of X.

Similarly, P (X|H) is posterior probability of X conditioned on H. That is to say, it is the probability that X is red and round given that we know that it is true that X is an apple. P(X) is the prior probability of X, i.e. it is the probability that a data record from our set of fruits is red and round.

Bayes theorem is useful in that it provides a way of calculating the posterior probability, P(H|X), from P(H), P(X), and P(X|H). Bayes theorem may be formally defined by the equation:

$$P(H|X)=P(X|H)P(H)/P(X).$$

SVM—The support vector machine (SVM) method has been introduced in TC by Joachims [1998, 1999] and subsequently used by Drucker et al. [1999], Dumais et al. [1998], Dumais and Chen [2000], Klinkenberg and Joachims [2000], Taira and Haruno [1999], and Yang and Liu [1999].

In geometrical terms, it may be seen as an attempt to find, among all the surfaces _1, _2, : : : in j. T j-dimensional space that separate the positive from the negative training examples (decision surfaces), the _i that separates the positives from the negatives by the widest possible margin. That is to say, such that the separation property is invariant with respect to the widest possible translation of _i.

This idea is best understood in a case where the positives and the negatives are linearly separable, in which the decision surfaces are (jT j−1)-hyper planes.

The SVM method chooses the middle element from the "widest" set of parallel lines, that is to say, from the set in which the maximum distance between two elements in the set is highest. It is noteworthy that this "best" decision surface is determined by only a small set of training examples, called the support vectors. The method described is applicable also to a case where the positives and the negatives are not linearly separable.

As argued by Joachims [1998], SVM offers two important advantages for TC: One being that term selection is often not needed, as SVM tends to resistant to overfitting—that is to producing a too complex statistical model compared with the amount of data, and can handle large dimensionality, and the other being that no human and computer processing effort in parameter tuning on a validation set is needed, as there is a theoretically motivated default choice of parameter settings which has also been shown to provide the best effectiveness.

The above described methods and algorithms are usually implemented in an on-line supervised manner, involving an analyst/user. A preferred embodiment of the present invention further implements unsupervised approaches. Preferably the unsupervised approaches facilitate processing relatively large volumes of textual attitude-data.

A preferred embodiment of the present invention involves unsupervised approaches that are based on data mining techniques.

A preferred embodiment of the present invention may utilize a two layers approach. One layer is an application layer and the other is an open query layer where the user may define relevant queries.

The application layer may use, but is not limited to using:

Data representation—a data representation component may be used for internally representing text of the attitude-data.

Memory and performance efficient data-structures are essential for performing the complex online analysis tasks. The data representation component translates the text to a compact binary representation, enabling faster analysis, for example using following steps.

Frequency analysis—a frequency analyzer may be used to provide the user with various statistics on different parameters, like: most frequent words, phrases, number of authors, unique authors, or distribution over time frame. The frequency analyzer may utilize a counter for counting words, phrases, etc. The counter provides raw data that is then processed by the frequency analyzer, to generate various statistics data.

Concept Analysis—a concept analyzer may be employed for finding the most interesting and relevant phrases relating to a certain concept, in the attitude-data.

The analysis handles single word phrases as well as relevant multiple word phrases. The concept analyzer may scan all the words or phrases in the collection, and assign a relevance score to each of them, to indicate relevance of the word or phrase to the researched concept.

Preferably, the relevance is measured by the ratio between a frequency for the word/phrase for co-occurring with a "leading concept/word" (i.e. the concept/word currently being analyzed) to the frequency of the co-occurrence not with the "leading concept/word". The higher this ratio is, the more relevant is this word/phrase.

In order to extract phrases (longer than one word), the analysis may include examining the top K (usually 100) words, and then look for phrases containing at least one of the top K words. Those phrases whose relevance score (as being calculated for single words) is higher than a certain threshold are considered relevant.

Correlator measurement—according to a preferred embodiment, a correlation measurer may be used to reveal interesting relationships between phrases and concepts in the attitude-data.

When trying to analyze a concept, one of the important information is what is mentioned\related to this concept, and how these are issue-related. This is done by measuring correlation.

According to a preferred embodiment of the present invention, the relevant phrases that were identified in the concept analysis stage are populated in a matrix where the distances between all the pair of phrases are calculated, as described ion greater detail herein below.

Then, the matrix may be populated into a visual interface, with the analyzed concept/phrase in the middle, and the relevant phrases surrounding it, as illustrated in FIG. 14 and discussed hereinabove.

The distance from the central concept measures the relevance to it, and the distances among the other phrases themselves represents their closeness. These metrics are directly derived from the distances in the distance matrix, populated as described below.

Preferably, in order to calculate the distance between two phrases, two parameters are taken into consideration: the significance of the co-occurrence of these phrases and the frequency of this occurrence.

According to a preferred embodiment, the distance between phrases a and b is calculated according to the formula:

$$D(a, b) = \frac{freq(a, b)^{1.5}}{freq(a, \bar{b})}$$

freq(a,b)=Frequency for a to co-appear with b, for some measure of togetherness freq(a,$\bar{b}$)=Frequency for a to appear where b does not appear Note that D(a,b) is not symmetric with D(b,a).

In a preferred embodiment, a distance between the two phrases, as put in the matrix, is the maximum of the two:

$$DV(a,b)=\text{Max}(D(a,b),D(b,a))$$

Quotation extraction—a quotation extractor is preferably employed for extracting key quotations from a data file that contains a given list of concepts, in order to provide a user with the relevant text citations best describing a relationship, existing in the attitude-data between a concept and its neighbor (relevant) phrases.

The challenge in the above case is identifying ad-hoc the most relevant documents, finding in them, the most relevant phrases and then displaying the phrases to the end user. The relevance in this case is measured by the frequency of the searched phrases in the text, in coordination with their distance in the message/document itself.

Clustering—according to a preferred embodiment, the concepts relating to the attitude-data may be clustered, say by a clusterer, as discussed hereinabove.

Clustering may include aimed clustering which includes clustering the concepts that strongly relate to a given topic. Clustering may also include free clustering where a given attitude-data set is clustered into distinctive groups which strongly relate to one another. This functionality is useful when analyzing new domains where the analyst doesn't have any prior knowledge on it.

Reference is now made to FIG. 21 which is an exemplary pseudo-code algorithm for clustering concepts relating to attitude-data, according to a preferred embodiment of the present invention.

Free clustering may be implemented using a clustering algorithm as exemplified using FIG. 21, to provide the user with the list of most relevant document clusters in the collection, along with cluster names and list (and view) of the documents belonging to each cluster.

The algorithm of FIG. 21 has the following advantages over the classical clustering algorithms: no predefined fixed number of clusters as in the classical clustering algorithms, ability to control the words that build the different clusters, and ability to merge and split clusters.

A general well known problem of traditional clustering algorithms pertains to relevance of the generated clusters to needs of the end-user, and that the traditional algorithms are based on the end-user's previous knowledge of well known world facts.

The example algorithm enables the user to control the output and quality of the final clusters, thus overcoming these shortcomings.

According to a preferred embodiment of the present invention, the processing of the attitude-data further includes data mining techniques.

Preferably, the data mining techniques may include, but are not limited to Pattern analysis and Trend analysis.

With Pattern analysis the processing includes searching for patterns in the statistics that may be provided by a statistics generator as described hereinabove.

The process may reveal relationships that are not obvious or sift out meaningful data from noise, exploiting favorable patterns and avoiding bad ones. Pattern analysis is a traditional part of data mining algorithms as applied on data stored in relational databases. However, in a preferred embodiment, Pattern analysis is further applied to unstructured textual data.

With Trend analysis, the processing further includes detecting emerging trends in the attitude-data, like new emerging products, consumer habits and more.

Optionally, trend analysis may be done by applying linear regression principles on the data set results. Once a list of related phrases is discovered, an analysis of correlation trends over time using linear regression is carried out If a strong positive (or negative) correlation trend (by having a high absolute value of the correlation derivative) is discovered, it is checked for consistency over time, by measuring the mean squared error.

The phrases that have the strongest trend derivative, and the least error, are regarded as those with the higher trends, and are displayed to the user along with their trend graph, and regression equation.

Platform Architecture

Reference is now made to FIG. 22 which is a simplified block diagram of an exemplary architecture of an apparatus for analyzing attitudes expressed in web sites, according to a preferred embodiment of the present invention.

An architecture according to a preferred embodiment may be a distributed environment architecture having loosely coupled components 2221-5, communicating through one central fault tolerant management and data center 2230.

High availability of the data center 2230 is ensured by running the data center in a computer server cluster with redundant machines.

The central data center 2230 preferably runs on top of a central data storage (data base/data warehouse) 2235, secured with redundant machines ensuring high-availability. The data-center 2230 stores the current system status and configuration (along with data to be analyzed) as well as the communication messages between the various system components.

Having a message based communication system enables full distribution of the various run time components, thus having full scaling capability. This architecture also enables real time configuration changes, affecting immediately all the running components without requiring a restart of the whole system or waiting for long update time.

Preferably, all the components communicate in an asynchronous mode, using messages. All the messages are posed to queues waiting for processing by each of the components. Each component owns one input message queue, one output queue and one management (commands) queue. The input queue contains the processing requests waiting for a component to be processed, upon completion, the processed document is posted to an output queue (which is actually the input for the next component in the pipeline).

An apparatus according to a preferred embodiment of the present invention may provide means for proper storage for any volume of data with fast access capabilities.

It is expected that during the life of this patent many relevant devices and systems will be developed and the scope of the terms herein, particularly of the terms "Collector", "Processor", "Outputter", "Database" and "data Warehouse", is intended to include all such new technologies a priori.

Additional objects, advantages, and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A method for analyzing attitudes expressed in web content, said attitudes being in relation to a subject, the method comprising:

collecting a collection of electronic communications from a web site, the collection of electronic communications originating from a person;

determining a first number of times that a word occurs in first electronic communications identifying the subject, the first electronic communications being included in the collection of electronic communications;

determining a second number of times that the word occurs in second electronic communications not identifying the subject, the second electronic communications being included in the collection of electronic communications;

determining a ratio of the first number and the second number;

comparing the ratio to a threshold;

identifying a phrase including the word as relevant when the ratio exceeds the threshold;

determining a subset of the electronic communications including the phrase;

processing the subset so as to generate attitude information indicative of a plurality of attitudes about the subject; and outputting said attitude information, to provide an analysis of said attitudes in relation to said subject.

2. The method of claim 1, wherein said collecting further comprises crawling said web site.

3. The method of claim 1, wherein said collecting further comprises extracting relevant data from relevant pages of said web site.

4. The method of claim 1, wherein said collecting further comprises creating a mark-up language format representation of said attitude data.

5. The method of claim 1, wherein said collecting further comprises integrating the attitude-data into non-redundant attitude data.

6. The method of claim 1, wherein said processing further comprises extracting metadata from the collection of electronic communications.

7. The method of claim 1, wherein said processing further comprises categorizing text of the collection of electronic communications.

8. The method of claim 7, wherein said categorizing text of the collection of electronic communications, comprises categorization according to style to identify an estimated age of the at least one person.

9. The method of claim 7, wherein said categorizing text of the collection of electronic communications, comprises categorization according to content.

10. The method of claim 1, further comprising analyzing the collection of electronic communications for finding in the collection of electronic communications at least one relevance-relationship between a phrase and a respective concept.

11. The method of claim 1, further comprising measuring correlations in the collection of electronic communications among phrases having a relevance-relationship with a common concept and between at least one of the phrases and said common concept.

12. The method of claim 1, further comprising extracting a quotation from the collection of electronic communications, said quotation being descriptive of a relevance-relationship existing in said attitude-data between a concept and respective phrases relating thereto.

13. The method of claim 1, further comprising clustering concepts relating to the collection of electronic communications.

14. The method of claim 1, wherein said collecting comprises collecting attitude-data from a plurality of web sites.

15. The method of claim 13, further comprising displaying said clustered concepts and accessing source content via said clusters.

16. A tangible computer readable medium storing instructions to analyze attitudes expressed in web content, said attitudes being in relation to a subject, wherein the instructions, when executed, cause a machine to:

collect a collection of electronic communications from a web site, the collection of electronic communications originating from a person;

determine a first number of times that a word occurs in first electronic communications identifying the subject, the first electronic communications being included in the collection of electronic communications;

determine a second number of times that the word occurs in second electronic communications not identifying the subject, the second electronic communications being included in the collection of electronic communications;

determine a ratio of the first number and the second number;

compare the ratio to a threshold;

identify a phrase including the word as relevant when the ratio exceeds the threshold;

determine a subset of the electronic communications including the phrase;

process the subset so as to generate attitude information indicative of a plurality of attitudes about the subject; and output said attitude information, to provide an analysis of said attitudes in relation to said subject.

17. The tangible computer readable medium of claim 16, wherein the instructions cause the machine to collect the collection of electronic communications by creating a mark-up language format representation of said attitude data.

18. The tangible computer readable medium of claim 16, wherein the instructions further cause the machine to categorize text of the collection of electronic communications.

\* \* \* \* \*

UNITED STATES PATENT AND TRADEMARK OFFICE
CERTIFICATE OF CORRECTION

PATENT NO.       : 7,596,552 B2                          Page 1 of 1
APPLICATION NO. : 11/517417
DATED            : September 29, 2009
INVENTOR(S)      : Levy et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 346 days.

Signed and Sealed this

Fourteenth Day of December, 2010

David J. Kappos
*Director of the United States Patent and Trademark Office*